(12) United States Patent
Carbaugh et al.

(10) Patent No.: US 10,806,063 B2
(45) Date of Patent: Oct. 20, 2020

(54) TILLAGE POINT

(71) Applicant: 360 Yield Center, LLC, Morton, IL (US)

(72) Inventors: Anthony B. Carbaugh, Washington, IL (US); Ryan Van Dusen, Wyanet, IL (US)

(73) Assignee: 360 Yield Center, LLC, Morton, IL (US)

( * ) Notice: Subject to any disclaimer, the term of this patent is extended or adjusted under 35 U.S.C. 154(b) by 0 days.

(21) Appl. No.: 15/404,178

(22) Filed: Jan. 11, 2017

(65) Prior Publication Data

US 2017/0196159 A1    Jul. 13, 2017

Related U.S. Application Data

(60) Provisional application No. 62/277,310, filed on Jan. 11, 2016.

(51) Int. Cl.
*A01B 15/02* (2006.01)
*A01B 13/08* (2006.01)

(52) U.S. Cl.
CPC ............ *A01B 15/025* (2013.01); *A01B 13/08* (2013.01)

(58) Field of Classification Search
CPC .............................. A01B 15/025; A01B 13/08
USPC ........................................................ 172/730
See application file for complete search history.

(56) References Cited

U.S. PATENT DOCUMENTS

| | | | | |
|---|---|---|---|---|
| 774,324 A | * | 11/1904 | Hill et al. | A01B 15/025 172/699 |
| 1,032,291 A | * | 7/1912 | McCollum | A01B 35/26 172/722 |
| 2,266,818 A | * | 12/1941 | Seaholm | A01B 35/26 172/722 |
| 2,699,104 A | * | 1/1955 | Jaeger | A01B 35/02 172/724 |
| 3,171,500 A | * | 3/1965 | Dils, Jr. | A01B 35/225 172/700 |
| 3,268,012 A | * | 8/1966 | Ratkowski | E02F 3/8152 172/700 |
| 4,403,662 A | * | 9/1983 | Dietrich, Sr. | A01B 49/02 172/156 |
| 4,538,689 A | | 9/1985 | Dietrich, Sr. | |
| 4,699,220 A | * | 10/1987 | Strohm | A01B 13/08 172/160 |
| 4,770,112 A | * | 9/1988 | Neumeyer | A01C 5/06 111/186 |
| 4,825,782 A | * | 5/1989 | Mikkelsen | A01B 35/26 111/123 |
| 5,437,337 A | | 8/1995 | Dietrich, Sr. | |
| 5,499,686 A | | 3/1996 | Parker | |
| 5,540,288 A | | 7/1996 | Dietrich, Sr. | |
| 5,605,196 A | * | 2/1997 | Grimm et al. | A01B 13/08 172/266 |
| 6,276,462 B1 | | 8/2001 | Dietrich, Sr. | |
| 6,422,323 B1 | | 7/2002 | Dietrich, Sr. | |
| 6,443,237 B1 | | 9/2002 | Myers et al. | |

(Continued)

*Primary Examiner* — Thomas B Will
*Assistant Examiner* — Joel F. Mitchell
(74) *Attorney, Agent, or Firm* — Thomas J. Oppold; Larkin Hoffman Daly & Lindgren Ltd.

(57) ABSTRACT

A tillage point configured to produce a uniform subsurface soil profile. The tillage point includes a main body having a leading edge, a top surface and a bottom surface. Wing sections extend laterally from the main body.

14 Claims, 32 Drawing Sheets

(56) References Cited

U.S. PATENT DOCUMENTS

| | | |
|---|---|---|
| D505,137 S | 5/2005 | Steinlage et al. |
| D512,078 S | 11/2005 | Poutre |
| 7,104,341 B2 | 9/2006 | Steinlage et al. |
| 7,568,439 B2 | 8/2009 | Steinlage et al. |
| D615,998 S | 5/2010 | Kovach et al. |
| 8,087,470 B2 | 1/2012 | Kovach et al. |
| 8,087,471 B2 | 1/2012 | Kovach et al. |
| 8,176,993 B2 | 5/2012 | McNabb |
| 8,646,544 B2 | 2/2014 | Ingersoll |
| 8,684,103 B2 | 4/2014 | Henry et al. |
| 8,967,287 B2 | 3/2015 | Rivera et al. |
| 2008/0257574 A1* | 10/2008 | Gonzalez ............... A01B 13/08 172/192 |

* cited by examiner

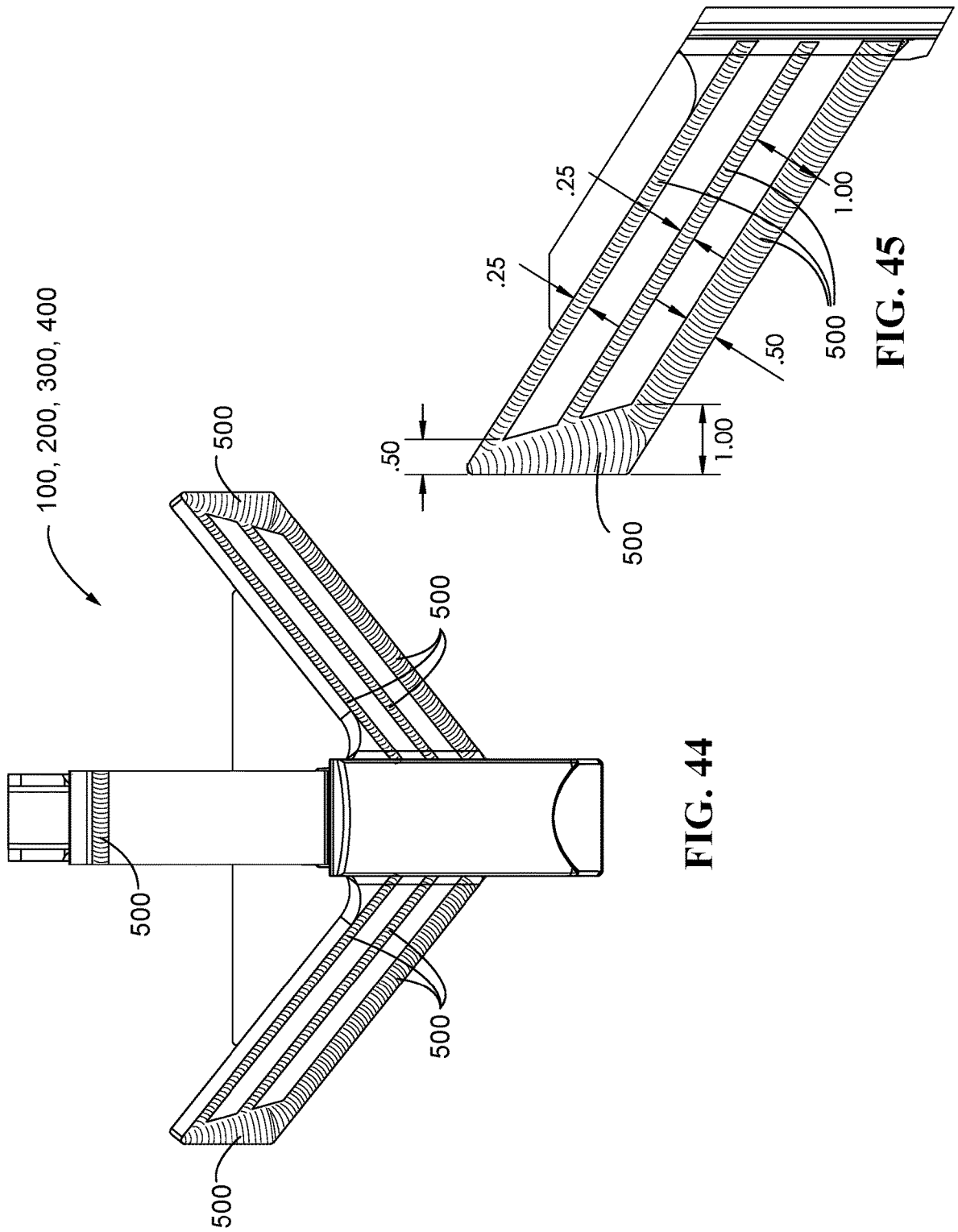

TILLAGE POINT

BACKGROUND

Deep tillage implements have a plurality of laterally and longitudinally spaced shanks which penetrate the soil as the implement advances. A tillage point, or ripper point, is mounted on a forwardly projecting, generally wedge shaped mount at the bottom of the shank to fracture the soil as the implement advances.

It has been found that conventional ripper points produce a soil profile with a mound of compact soil between the ripper points as illustrated in FIG. 1. This mound of compact soil has a detrimental effect on root penetration into the soil. Accordingly, there is a need for an improved ripper point that produces a uniform and ideal subsurface soil profile by avoiding or minimizing the creation of mounds of compact soil between the ripper points.

BRIEF DESCRIPTION OF THE DRAWINGS

FIG. 44 is a top plan view of the ripper point of FIG. 35 showing surface treatment FIG. 45 is an enlarged view of a portion of FIG. 44 showing the surface treatment.

DESCRIPTION

Figure 1:
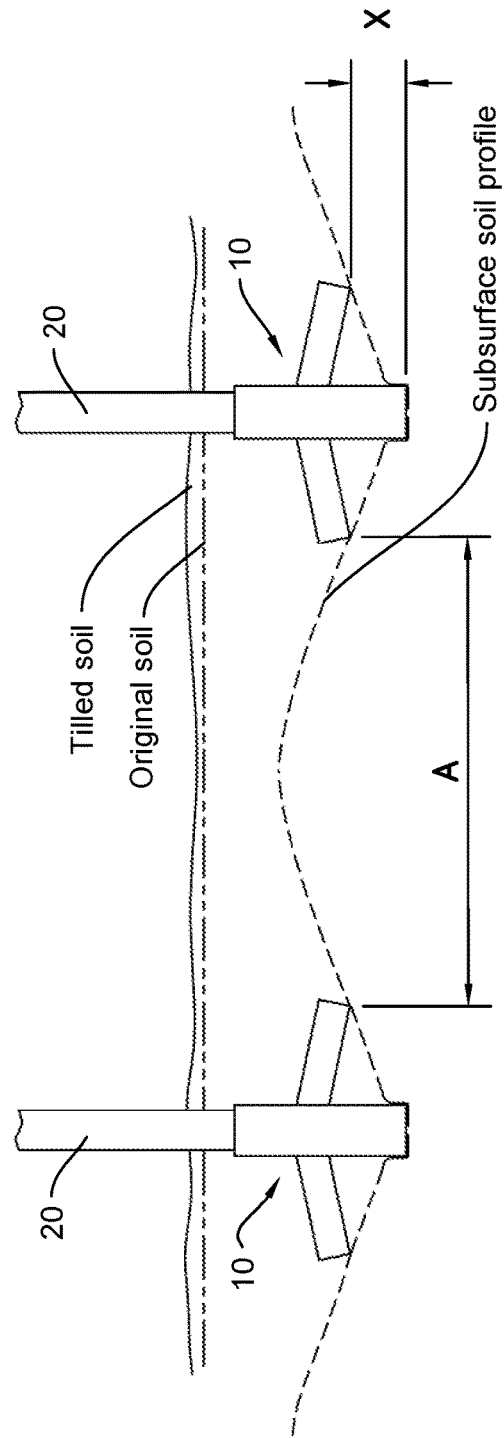
FIG. 1 is a representative illustration of a soil profile generated using a conventional ripper point.
Figure 2:
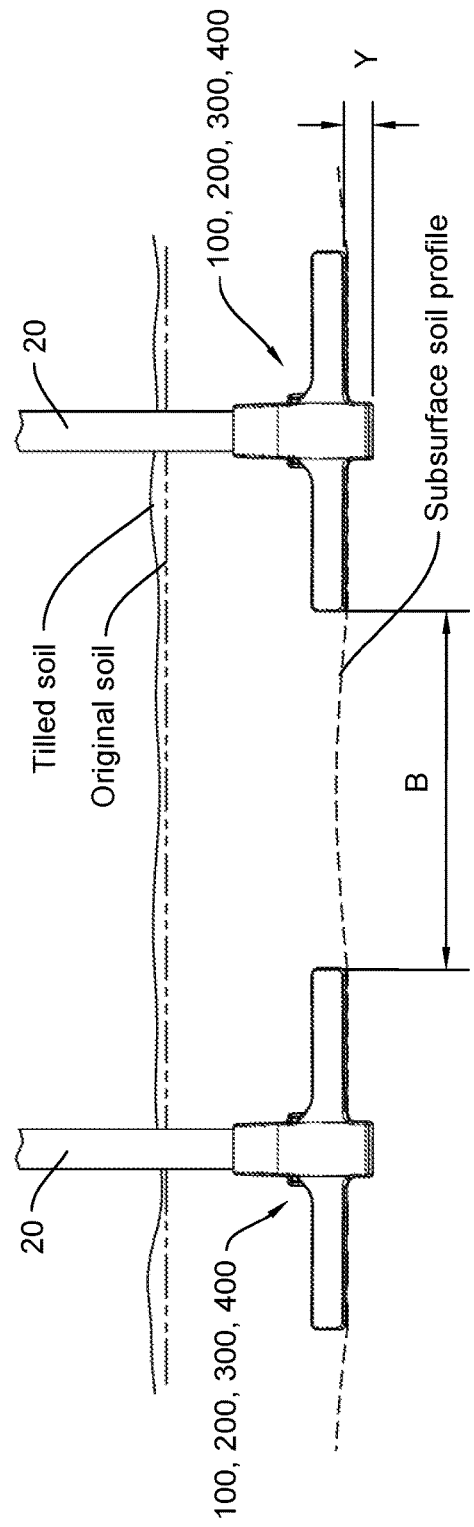
FIG. 2 is a representative illustration of a soil profile generated using the embodiments of the ripper point of the present invention.

Referring now to the drawings wherein like reference numerals designate the same or corresponding parts throughout the several views, FIG. 2 is a representative illustration of the soil profile that is generated using any of the embodiments 100, 200, 300, 400 of ripper points of the present invention. Each of the embodiments 100, 200, 300, 400 is discussed in more detail below, but it should be appreciated that the features common to each of the embodiments 100, 200, 300, 400 results in a soil profile that avoids the undesirable mounding of compact soil between the ripper points that is typically produced with implements using conventional ripper points as illustrated in FIG. 1.

In comparison to conventional ripper points 10 as illustrated in FIG. 1, the configuration of the ripper points 100, 200, 300, 400 of the present invention have a much wider wingspan than the wingspan of conventional ripper points. This wider wingspan reduces the horizontal distance B between the wing tips of the adjacent wings. Additionally, in each of the embodiments 100, 200, 300, 400 the vertical distance Y between the leading edge of the ripper point and the leading edge of the wings is preferably around 1 inch which is significantly shallower than the vertical distance X of the corresponding parts of conventional ripper points.

Additionally, in order to reduce drag on the ripper points as they are pulled through the soil, in each of the embodiments 100, 200, 300, 400, the leading edge of the wings is sloped downwardly and forwardly from the trailing edge of the wings. After testing, it has been found that the particular geometry of the various components of the ripper points common to each of the embodiments of the ripper points 100, 200, 300, 400 will produce a soil profile which eliminates or significantly reduces the undesirable mounds of compact soil between conventional ripper points.

Figure 3A:
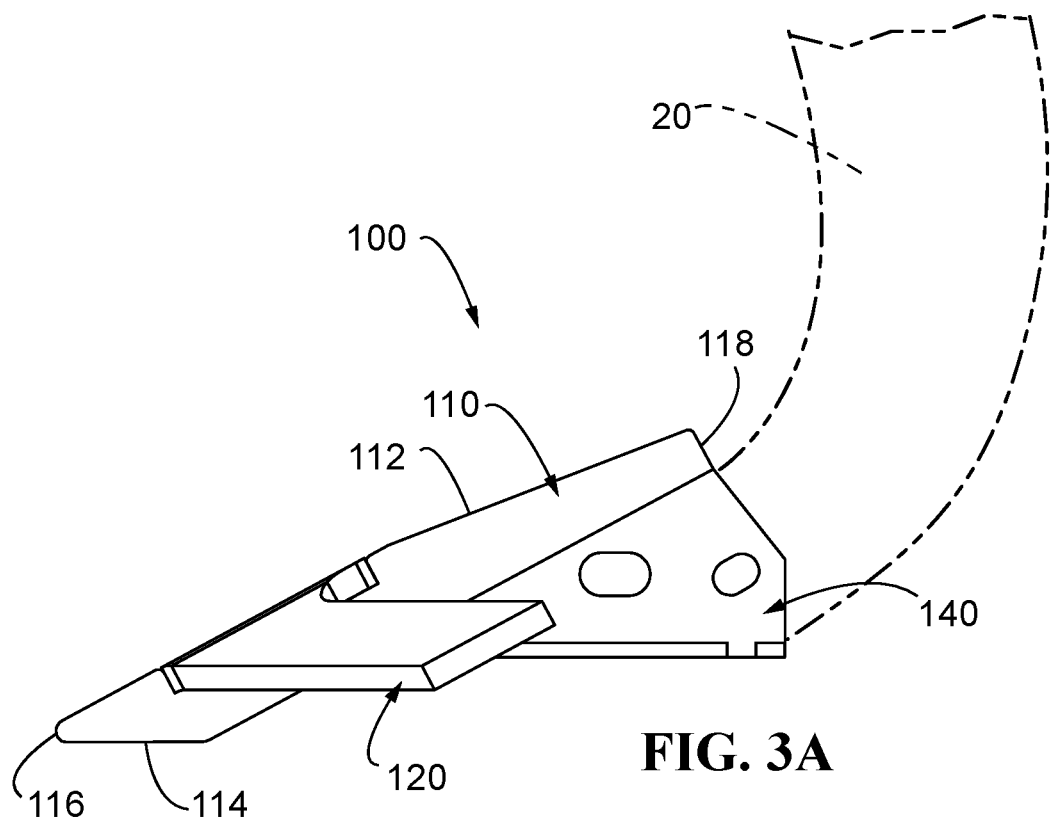
FIGS. 3A and 3B are side elevation views showing the geometry applicable to the various embodiments of the ripper point of the present invention and showing the ripper point attached to a shank of a tillage implement.
Figure 3B:
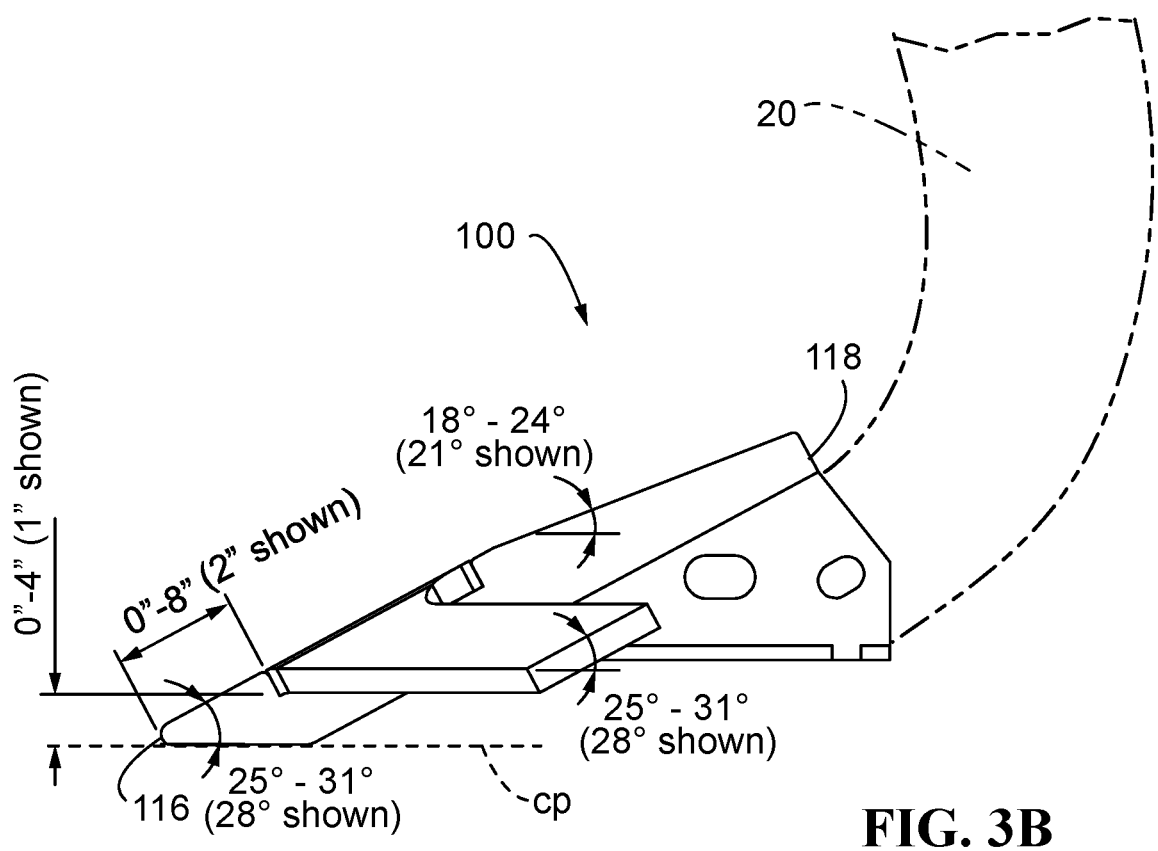
Figure 4:
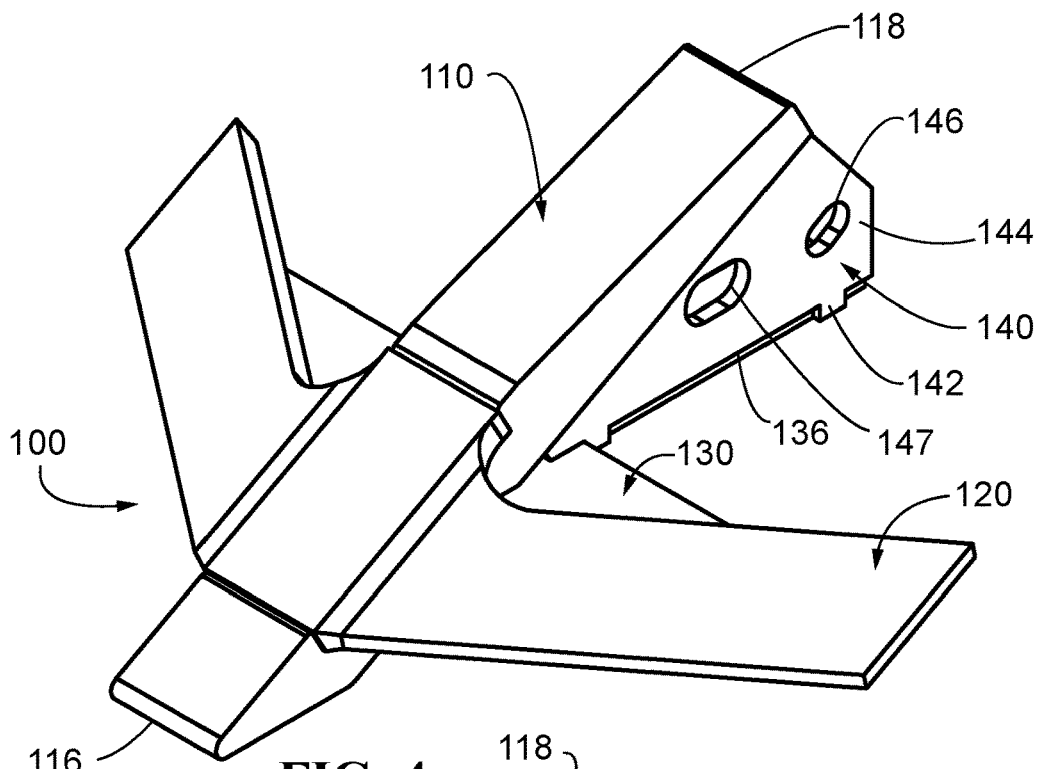
FIG. 4 is a top, front perspective view of a first embodiment of the ripper point of the present invention.
Figure 5:
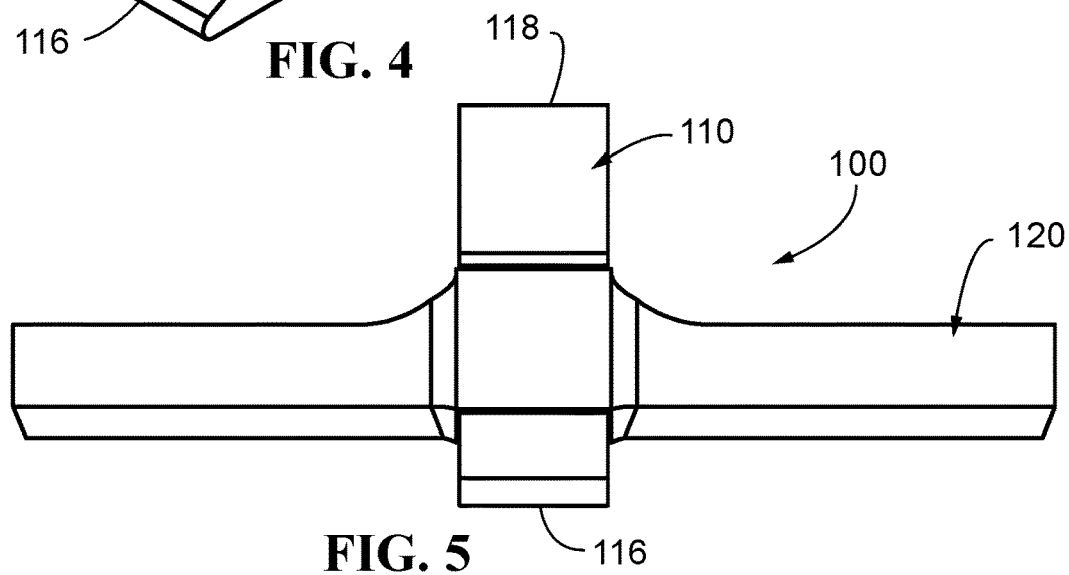
FIG. 5 is a front elevation view of the ripper point of FIG. 4.
Figure 6:
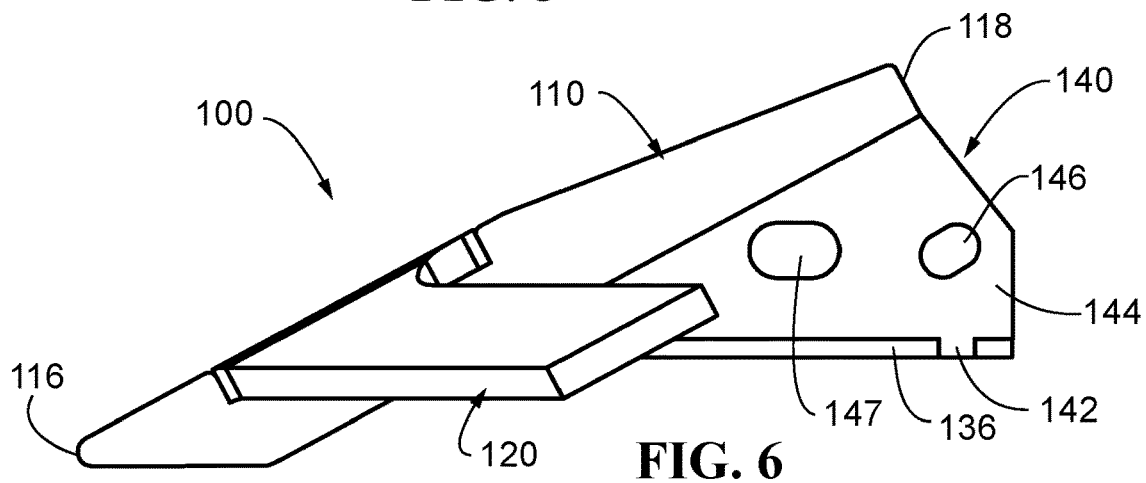
FIG. 6 is a left side elevation view of the ripper point of FIG. 4.
Figure 7:
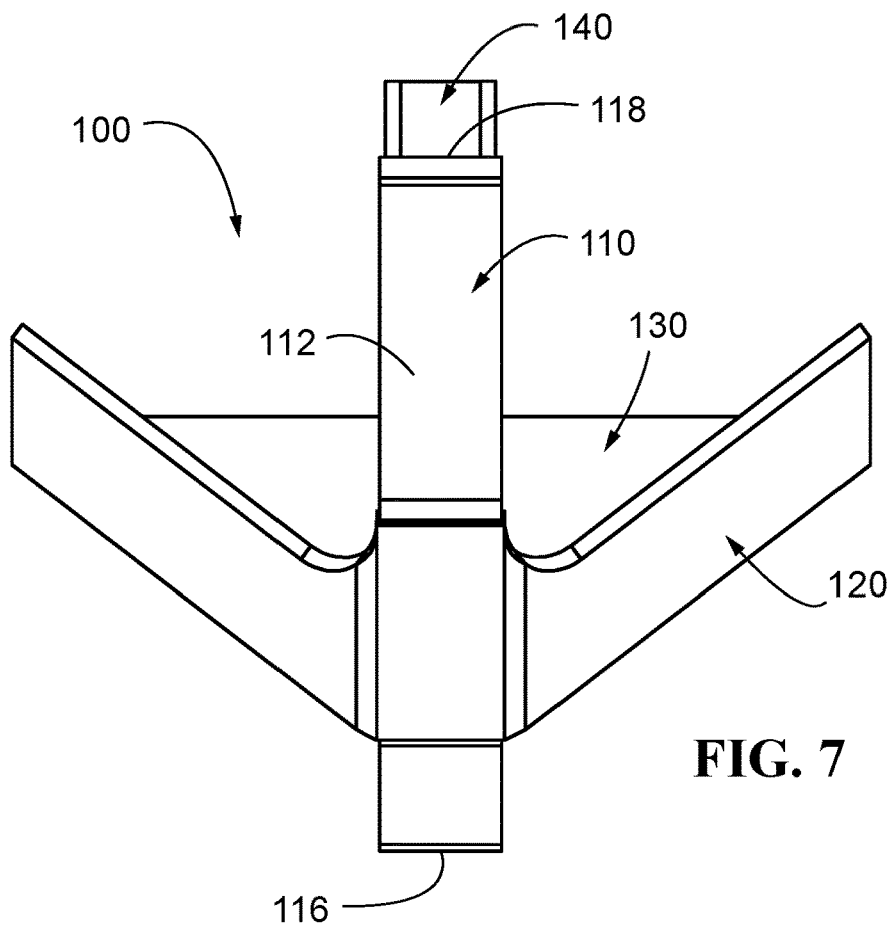
FIG. 7 is a top plan view of the ripper point of FIG. 4.
Figure 8:
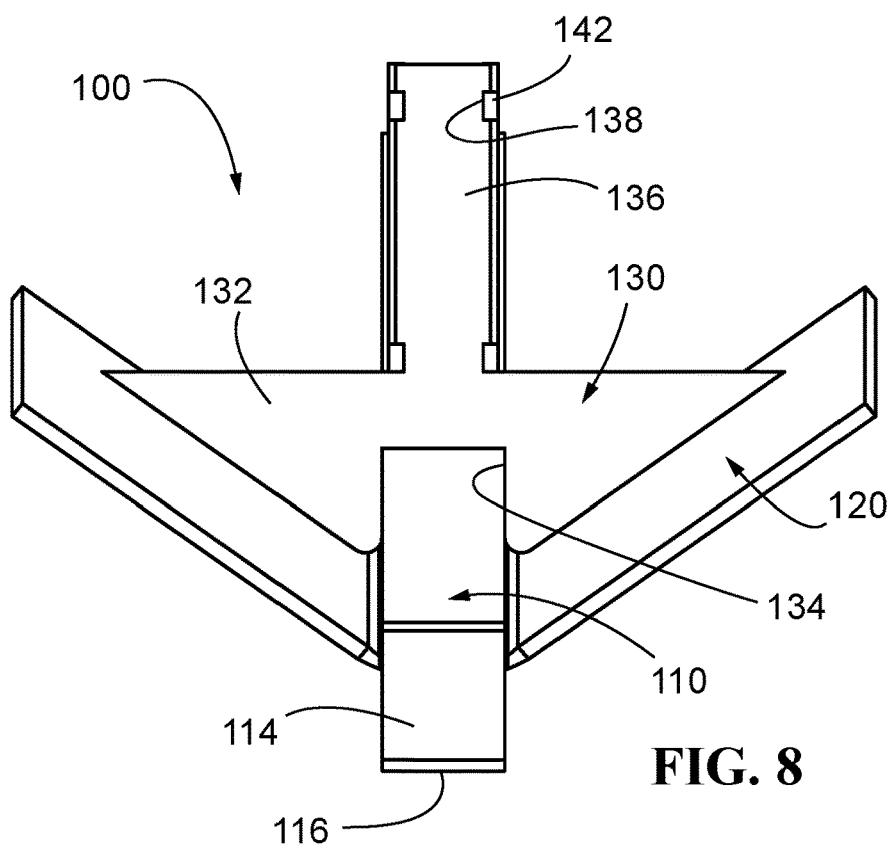
FIG. 8 is a bottom plan view of the ripper point of FIG. 4.
Figure 10:
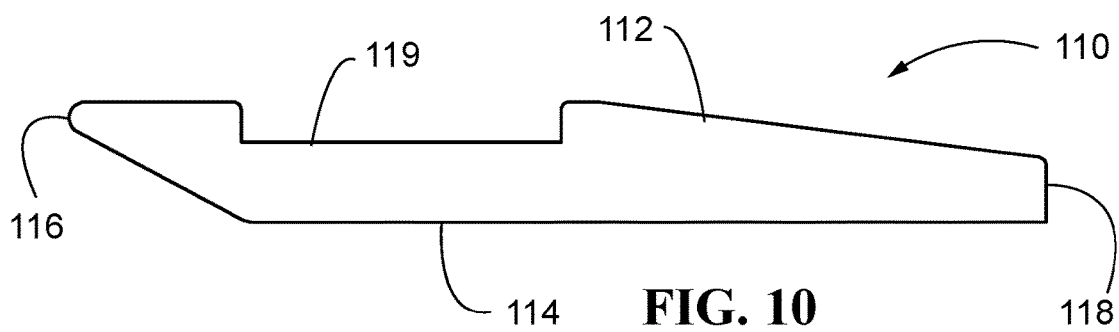
FIG. 10 is a side elevation view of the body of FIG. 9.
Figure 9:
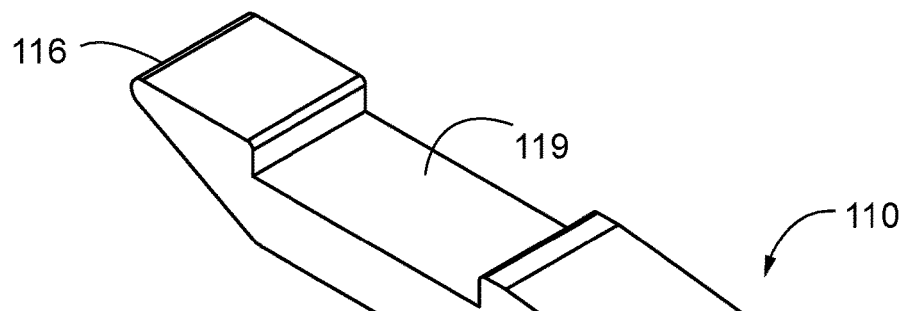
FIG. 9 is a top, rear perspective view of the body of the ripper point of FIG. 4.

FIGS. 4-8 illustrate one embodiment of a ripper point 100. The ripper point 100 is comprised of a main body 110, a wing member 120, a wing support plate 130 and a shank bracket 140. As best viewed in FIGS. 9 and 10, the main body 110 is generally rectangular in configuration with an upper surface 112 and a lower surface 114 and includes a forward nose 116 and a rearward tail 118. The main body 110 tapers slightly, toward the tail 118. The nose 116 is beveled, on the lower surface 114 such that when the ripper point 100 is attached to a shank 20 of the tillage implement as shown in FIGS. 3A-3B, the lower surface of the beveled nose 116 defines a substantially horizontal cutting plane CP. As illustrated in FIG. 3B, in a preferred embodiment, the nose bevel angle is between about 25° to about 31° and preferably about 28°. Also as shown in FIG. 3B, the tail slopes at an angle between about 18° to about 24° from horizontal, and preferably at an angle of about 21° from horizontal, which reduces the overall vertical height of the point to reduce drag. Referring again to FIGS. 9 and 10, the upper surface 112 of the main body 110 includes a cutout or recessed area 119 sized to receive the wing member 120.

Figure 11:
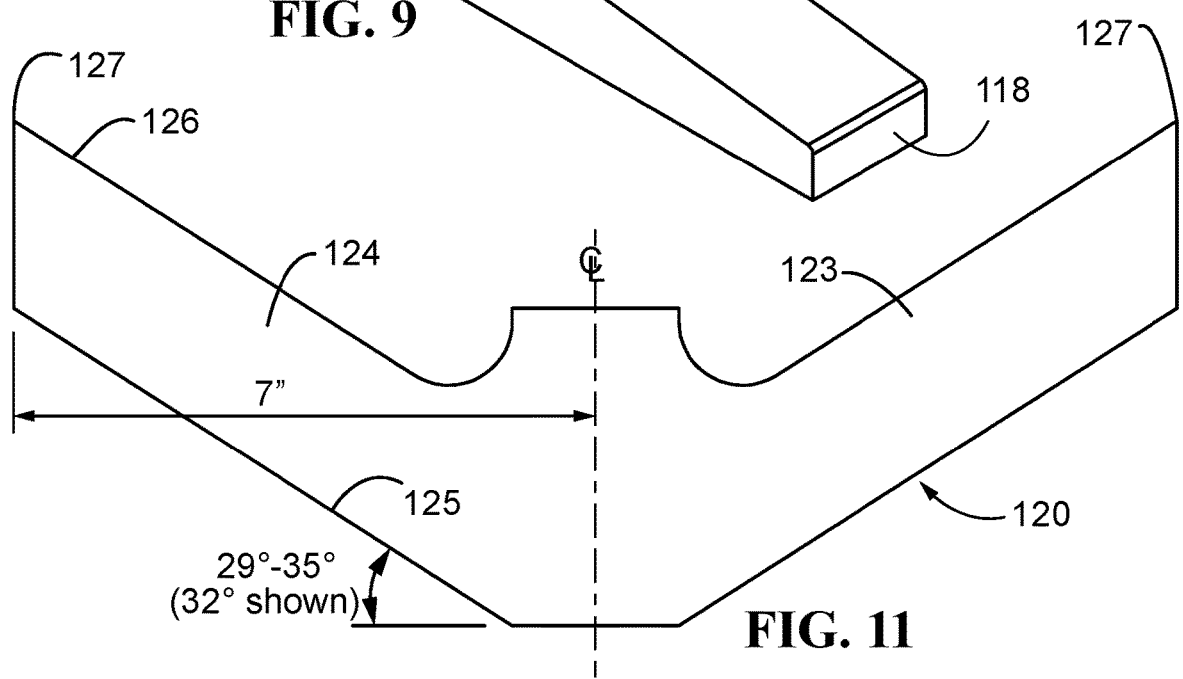
FIG. 11 is a top plan view of the wing of the ripper point of FIG. 4.
Figure 12:
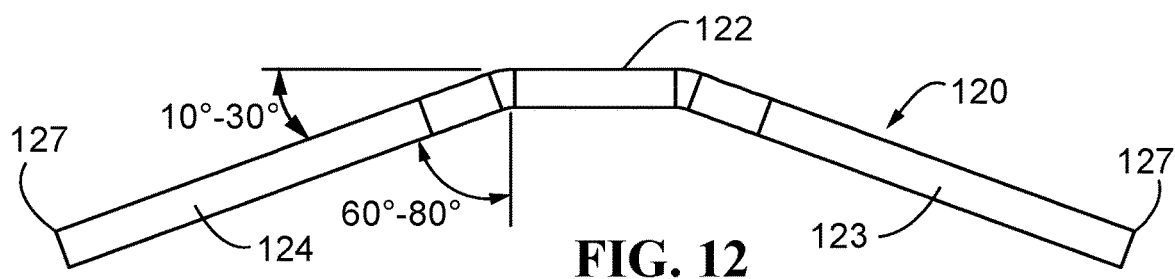
FIG. 12 is a front elevation view of the wing of FIG. 11.
Figure 14:
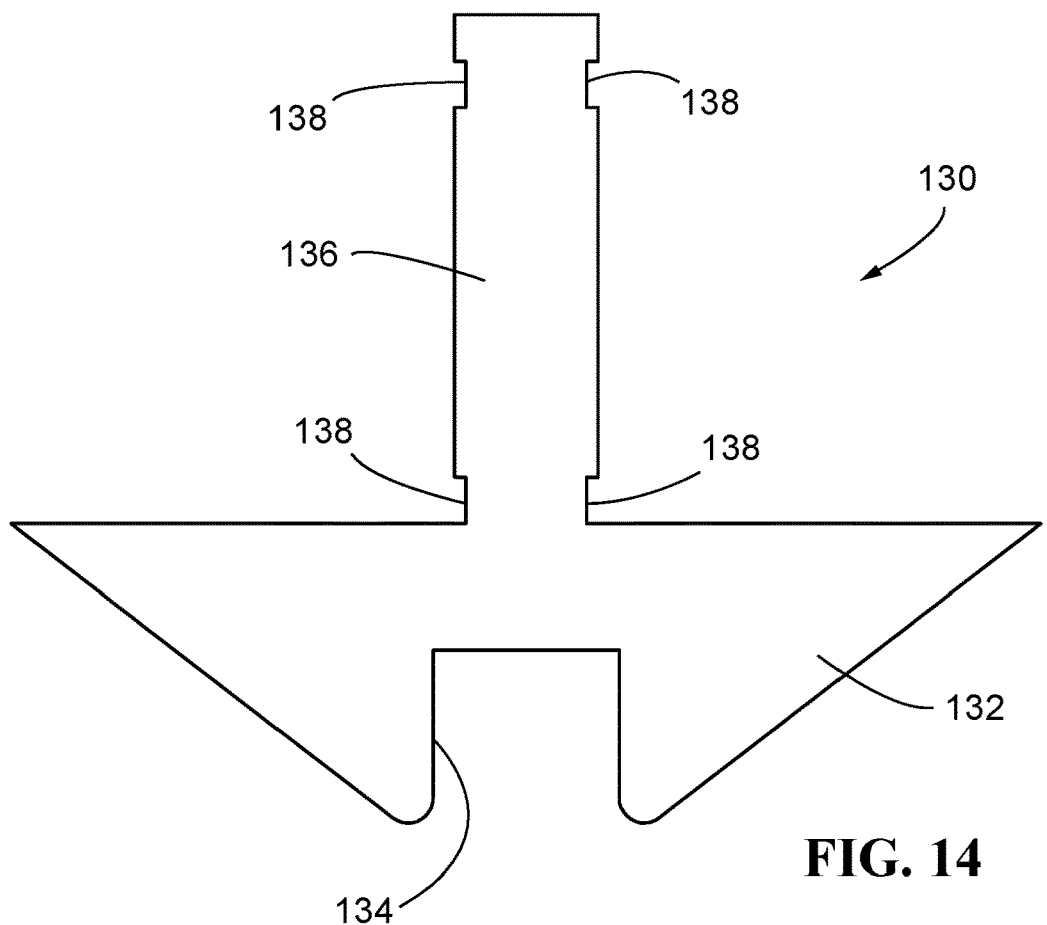
FIG. 14 is a plan view of the wing support of FIG. 13.
Figure 13:
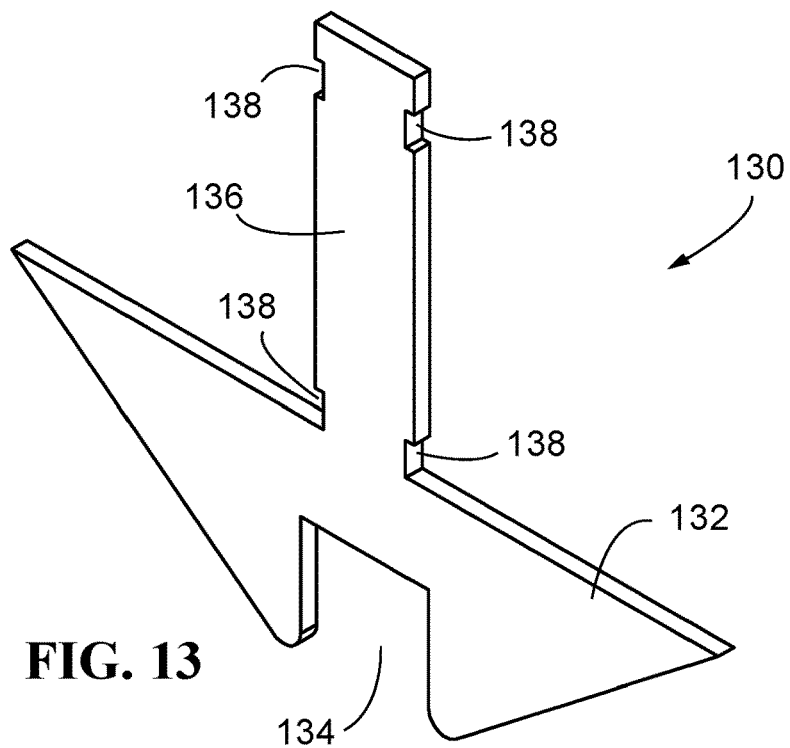
FIG. 13 is a perspective view of the wing support of the ripper point of FIG. 4.

Referring to FIGS. 11 and 12, the wing member 120 includes a central portion 122 sized to be received within the recess 119 formed in the upper surface 112 of the main body 110 and is secured within the recess 119 by welds. The wing member 120 includes right and left wing sections 123, 124 with a leading edge 125 and a trailing edge 126. As best viewed in FIG. 11, the wing sections 123, 124 sweep rearwardly at an angle of about 29° to about 35° and preferably at an angle of about 32°. As best viewed in FIG. 3B, the wing sections also slope downwardly and forwardly from the trailing edge 126 to the leading edge 125 at an angle between about 25° to about 31° and preferably about 28°. The wing sections 123, 124 also slope downwardly from the central portion 122, preferably at an angle between 10°-30° as best viewed in FIG. 12. In a preferred embodiment, the wing sections extend about 7 inches from the centerline of the center portion 122, resulting in an overall wingspan from wingtip-to-wingtip 127 of about 14 inches.

Referring again to FIG. 3B, wing member 120 is positioned on the main body 110 such that the vertical distance between the cutting plane CP and the leading edge 125 of the wing member 120 is between about 0 inches to about 4 inches, and preferably about 1 inch, and the distance between the forward most edge of the nose 116 to the leading edge of the wing member is between about 0 inches to about 8 inches, and preferably about 2 inches.

Referring to FIGS. 8 and 13-16, the wing support plate 130 includes a triangular shaped head 132 with a cutout 134 sized to receive the underside of the main body 110. The triangular shaped head 132 is configured to engage with the underside of the wing sections 123, 124. Welds secure the triangular head 132 to the main body 110 and to the underside of the wing sections 123, 124, thereby providing structural support and rigidity to the wing sections 123, 124.

Figure 16:
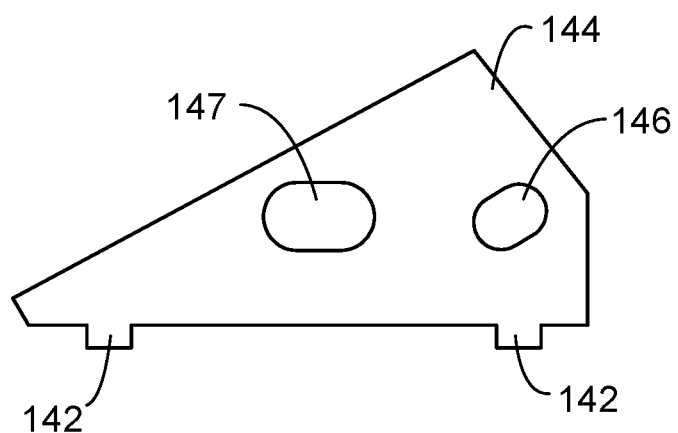
FIG. 16 is side elevation view of the shank bracket of FIG. 15.
Figure 15:
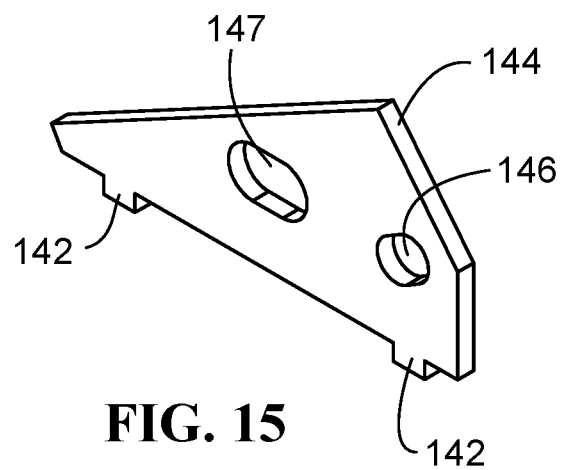
FIG. 15 is a perspective view of the shank bracket of the ripper point of FIG. 4.
Figure 17:
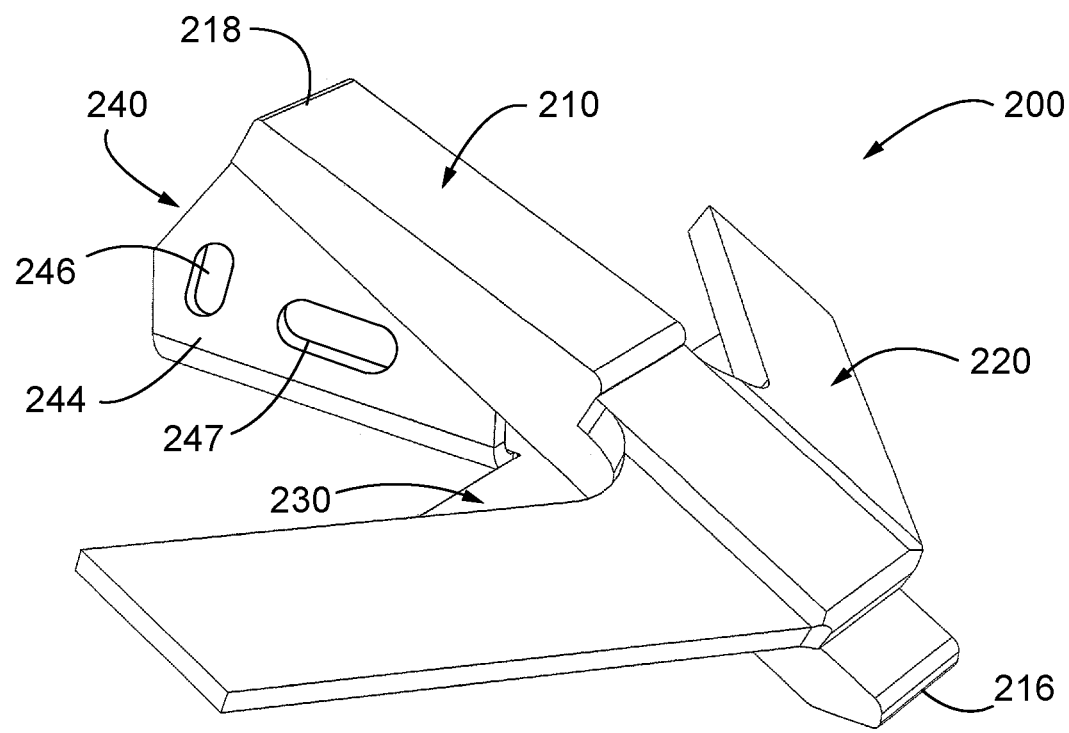
FIG. 17 is a top, front perspective view of another embodiment of the ripper point of the present invention.
Figure 18:
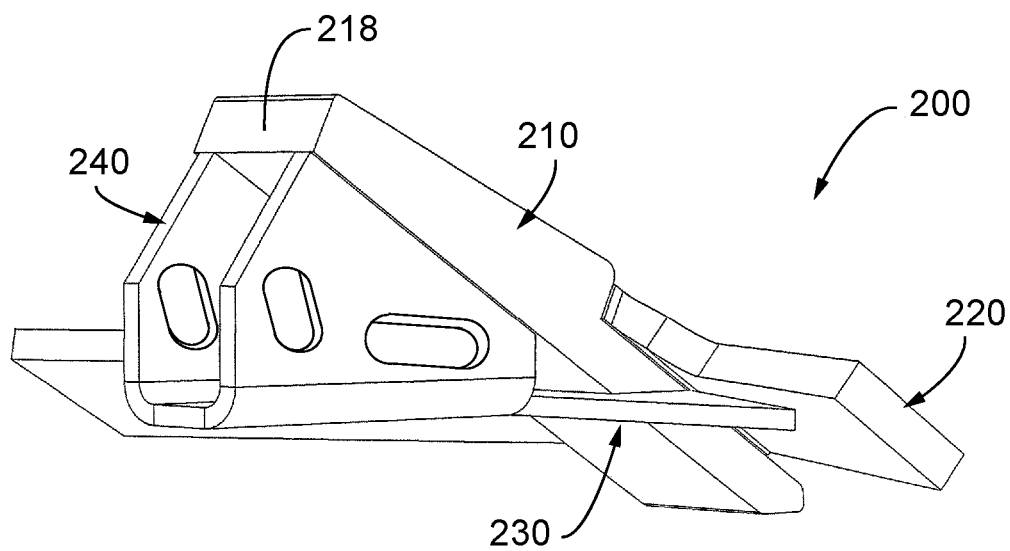
FIG. 18 is a rear perspective view of the ripper point of FIG. 17.

A leg 136 extends rearwardly from the triangular head 132. The leg 136 includes notches 138 which receive tabs 142 projecting from side plates 144 (FIGS. 15-16). The side plates 144 and the rearwardly extending leg 136 along with the tail end 118 of the main body 110 together form a channel defining the shank bracket 140. Apertures 146, 147 are provided in the side plates 144 for bolting the ripper point 100 to the shank 20 of the tillage implement as shown in FIG. 3A.

FIGS. 17-26 illustrate a second embodiment of a ripper point 200. The second ripper point embodiment 200 has substantially the same overall configuration as the first ripper point embodiment 100, except that the second ripper point embodiment 200 is comprised of only three pieces which are welded together as best illustrated in the exploded perspective views of FIGS. 19 and 20.

The second ripper point embodiment 200 is comprised of a main body 210, a wing member 220, and a wing support plate 230 that also forms the shank bracket 240. As best viewed in FIGS. 19 and 20, the main body 210 is generally rectangular in configuration with an upper surface 212 and a lower surface 214 and includes a forward nose 216 and a rearward tail 218. The main body 210 tapers slightly, toward the tail 218. The nose 216 is beveled on the lower surface 214 such that when the ripper point 200 is attached to a shank 20 of the tillage implement (see, e.g., FIGS. 3A-3B), the lower surface of the beveled nose 216 defines a substantially horizontal cutting plane CP. Referring again to FIGS. 19 and 20, the upper surface 212 of the main body 210 includes a recessed area 219 to receive the wing member 220.

Figure 19:
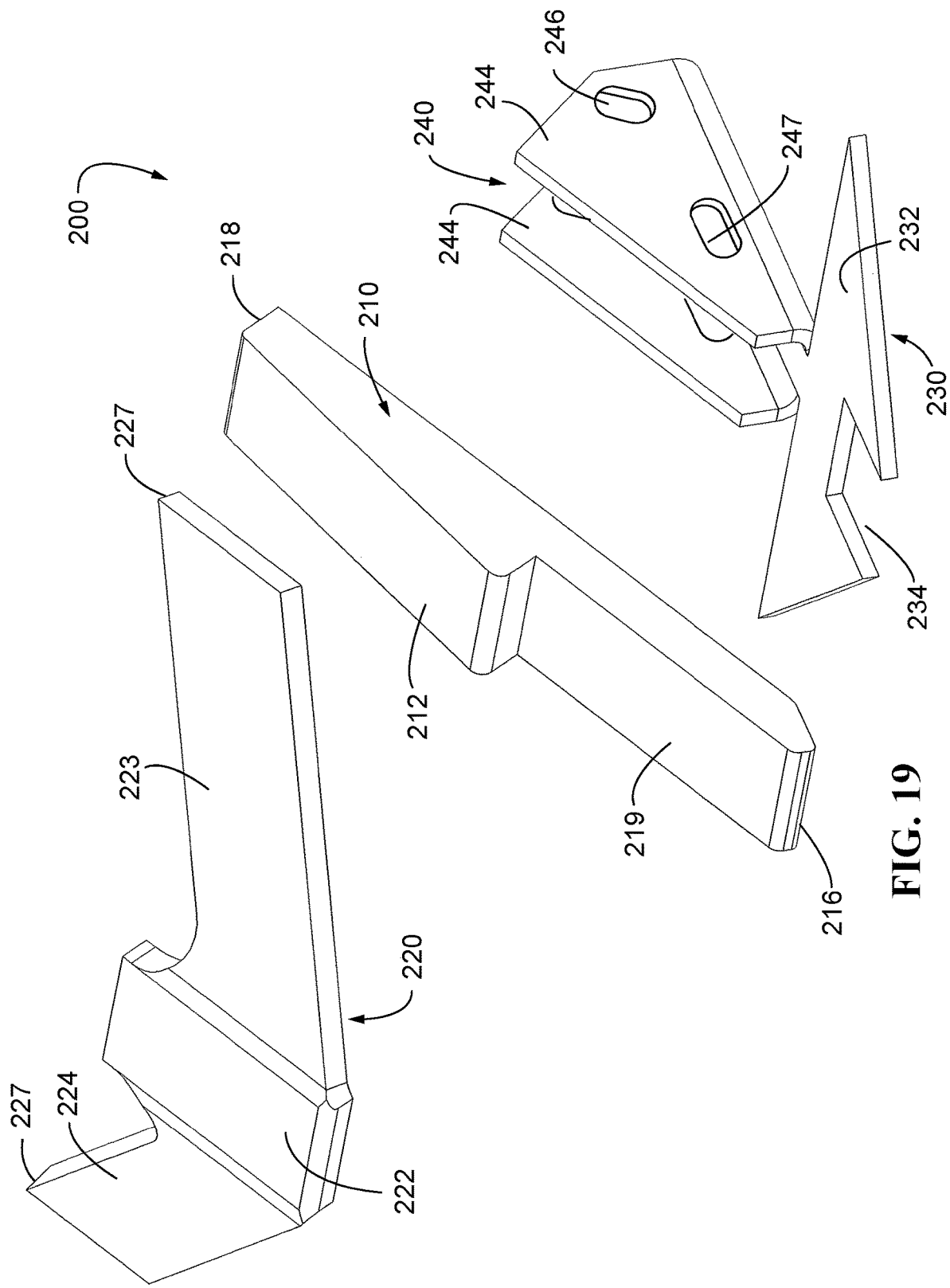
FIG. 19 is an exploded front perspective view of the ripper point of FIG. 17.
Figure 20:
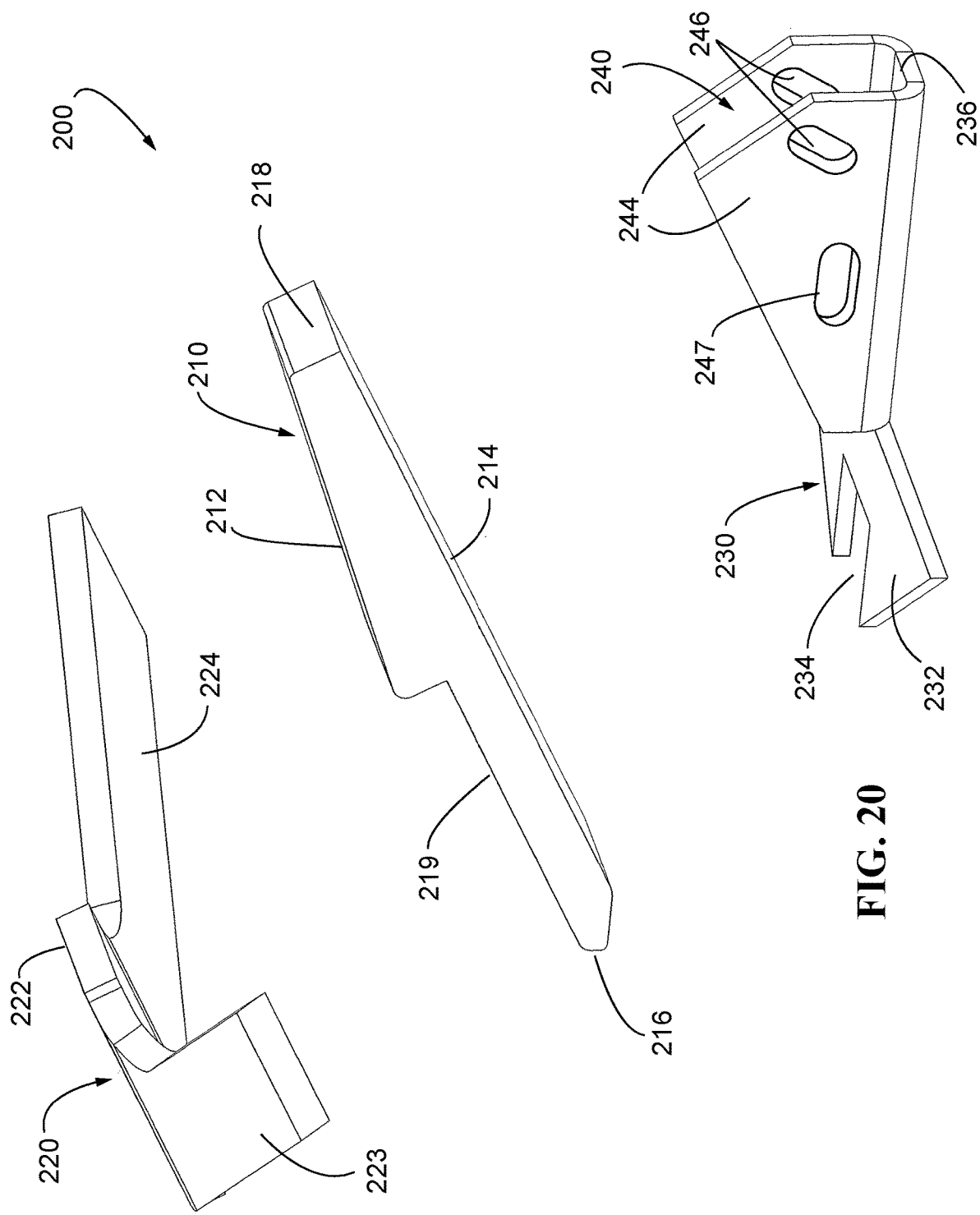
FIG. 20 is an exploded rear perspective view of the ripper point of FIG. 17.
Figure 21:
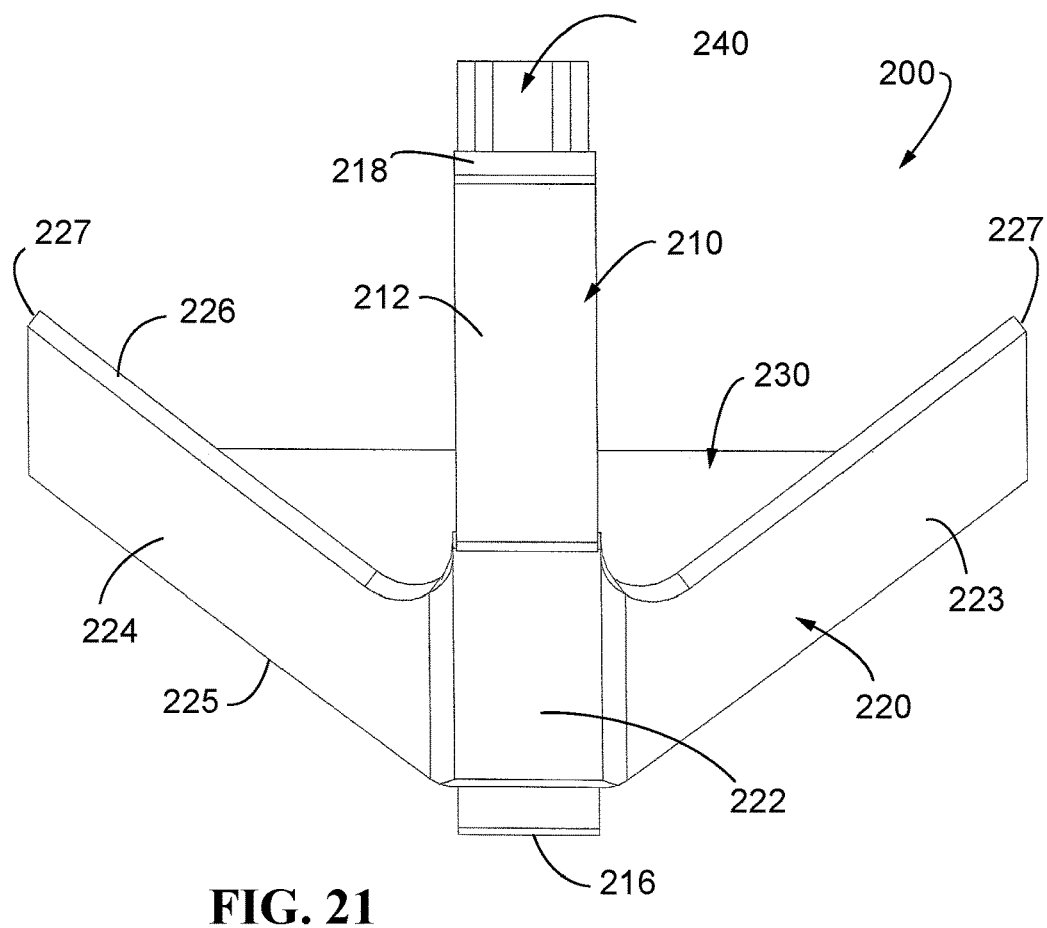
FIG. 21 is a top plan view of the ripper point of FIG. 17.
Figure 22:
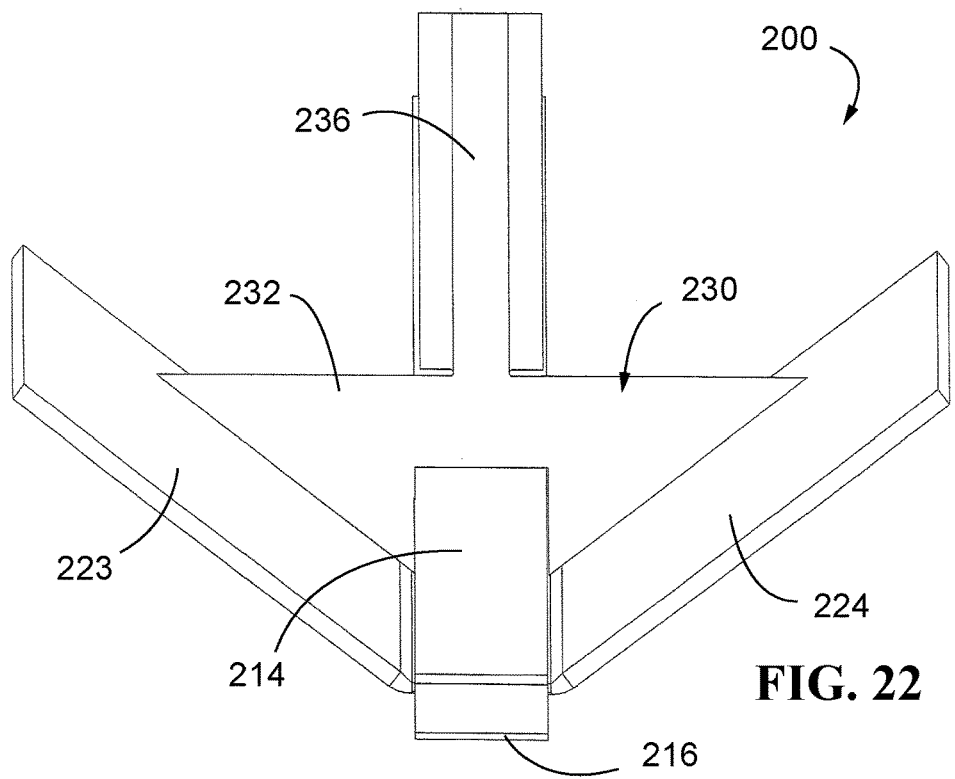
FIG. 22 is a bottom plan view of the ripper point of FIG. 17.
Figure 23:
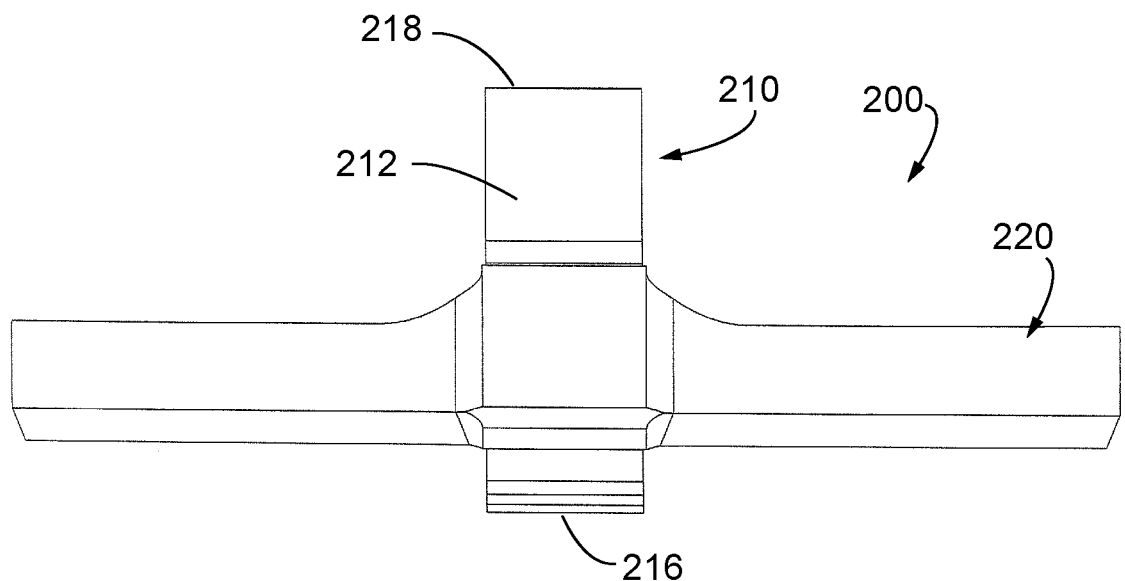
FIG. 23 is a front elevation view of the ripper point of FIG. 17.
Figure 24:
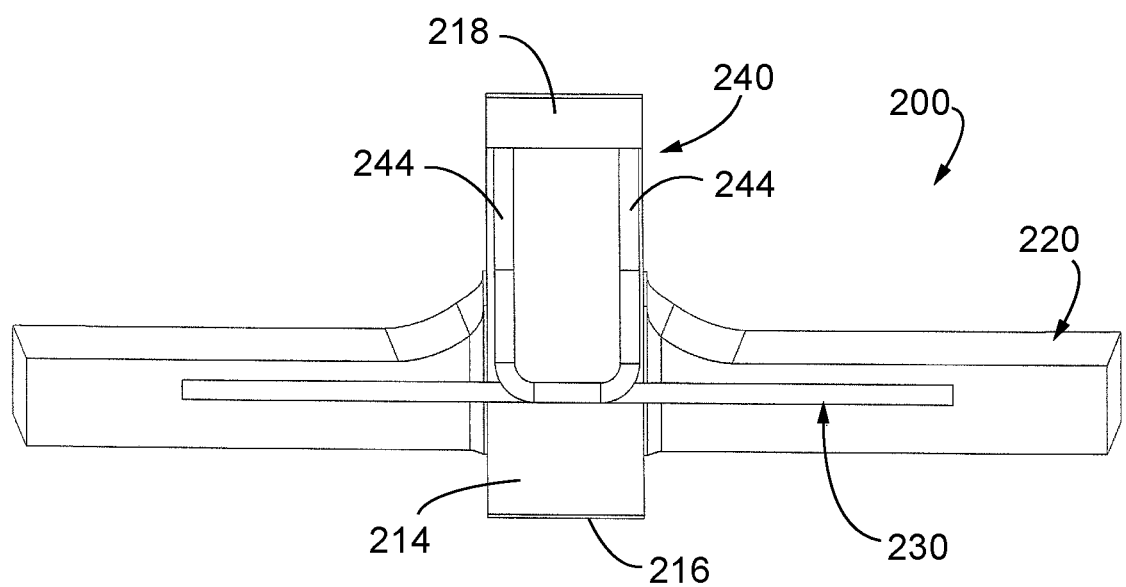
FIG. 24 is a rear elevation view of the ripper point of FIG. 17.
Figure 25:
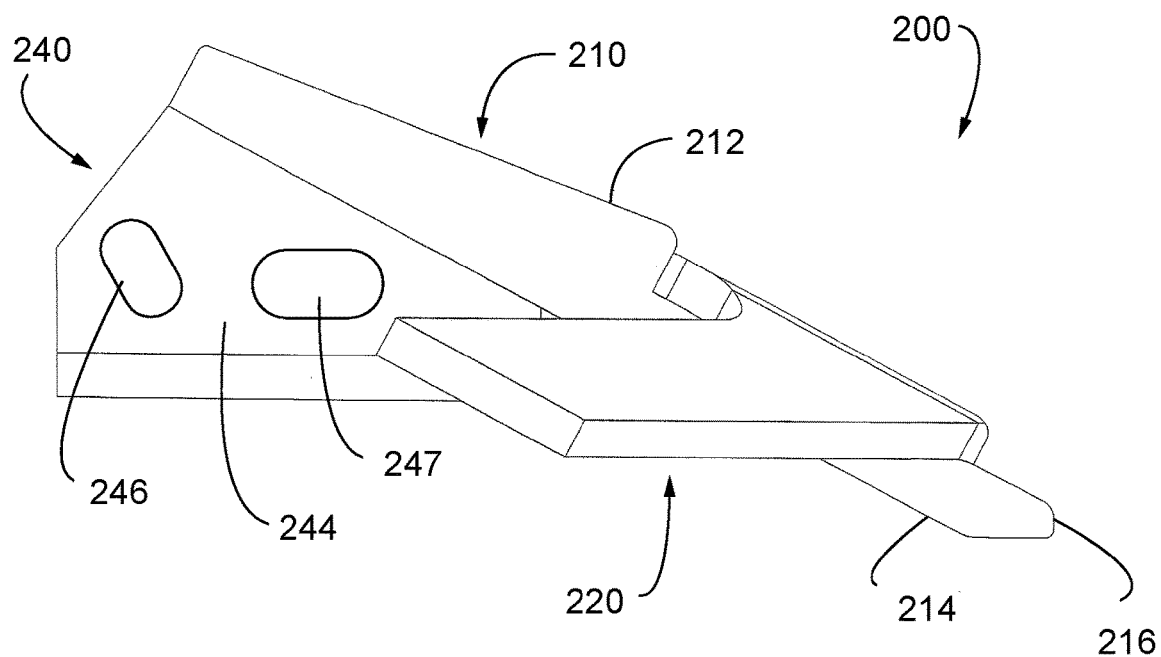
FIG. 25 is a right side elevation view of the ripper point of FIG. 17.
Figure 26:
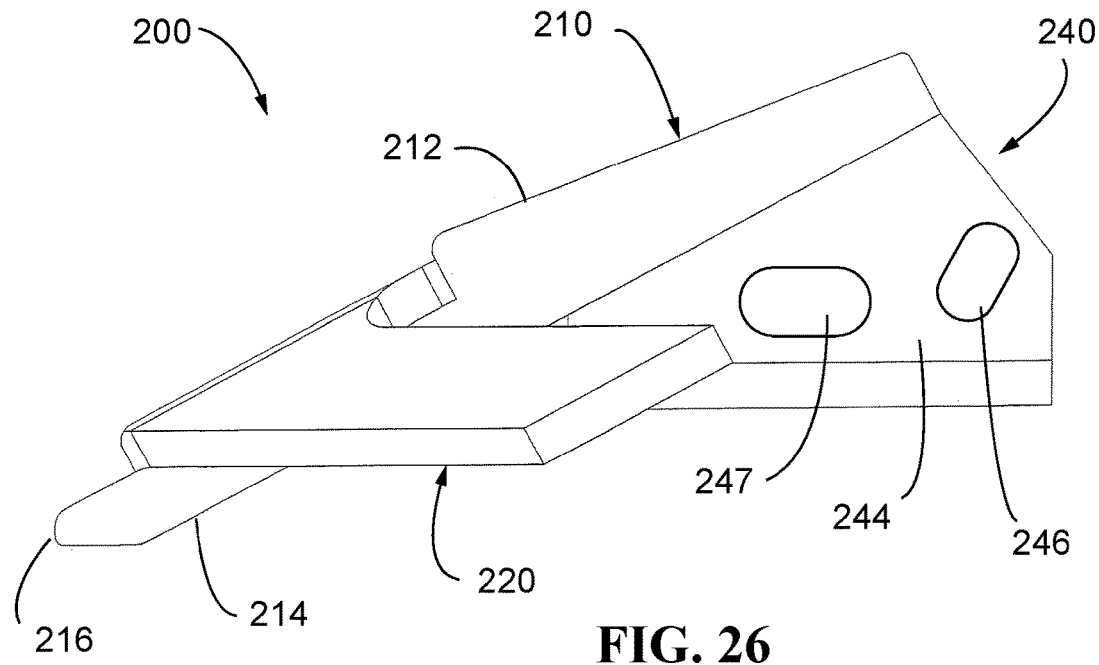
FIG. 26 is a left side elevation view of the ripper point of FIG. 17.
Figure 27:
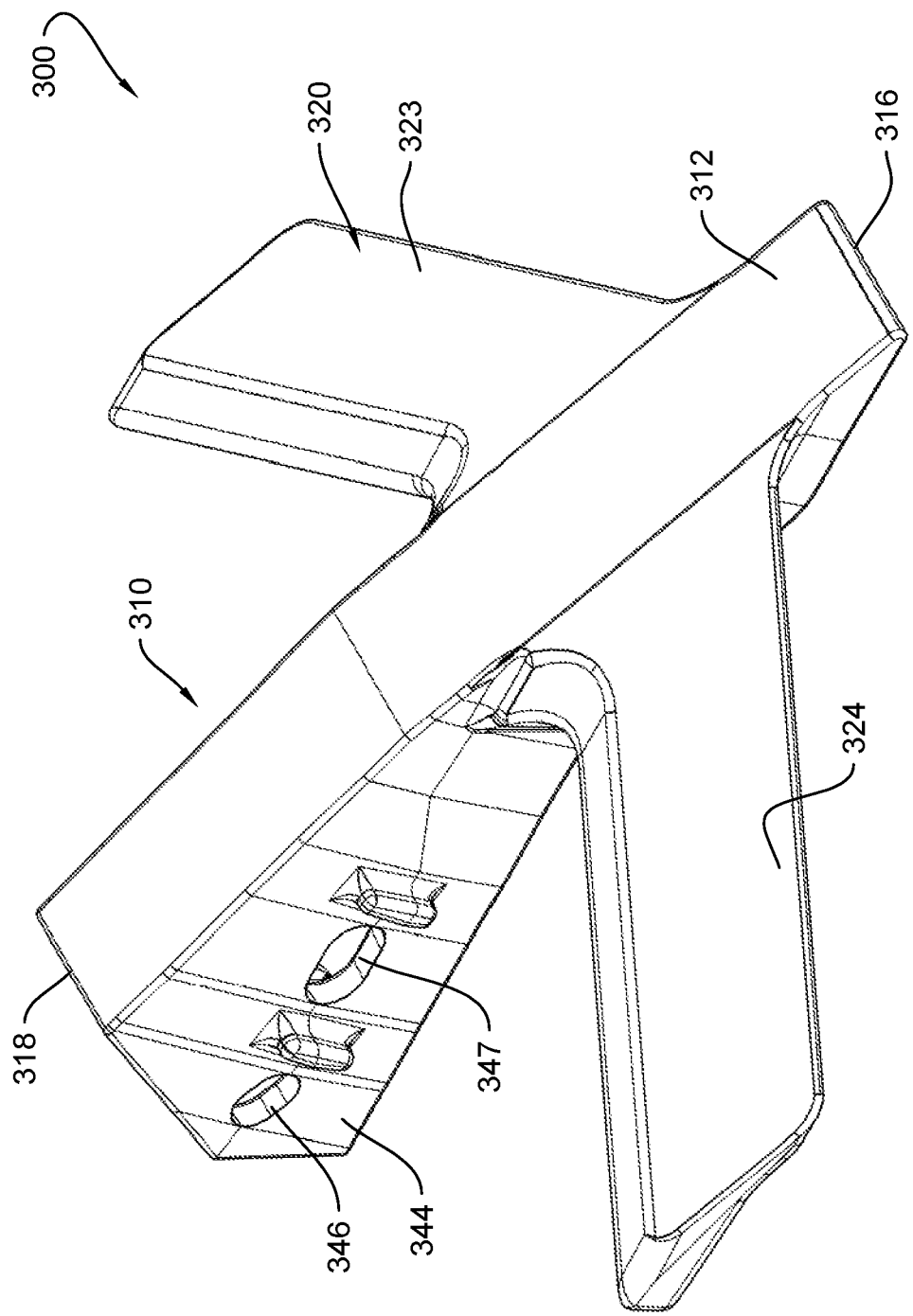
FIG. 27 is a top, front perspective view of another embodiment of the ripper point of the present invention.
Figure 28:
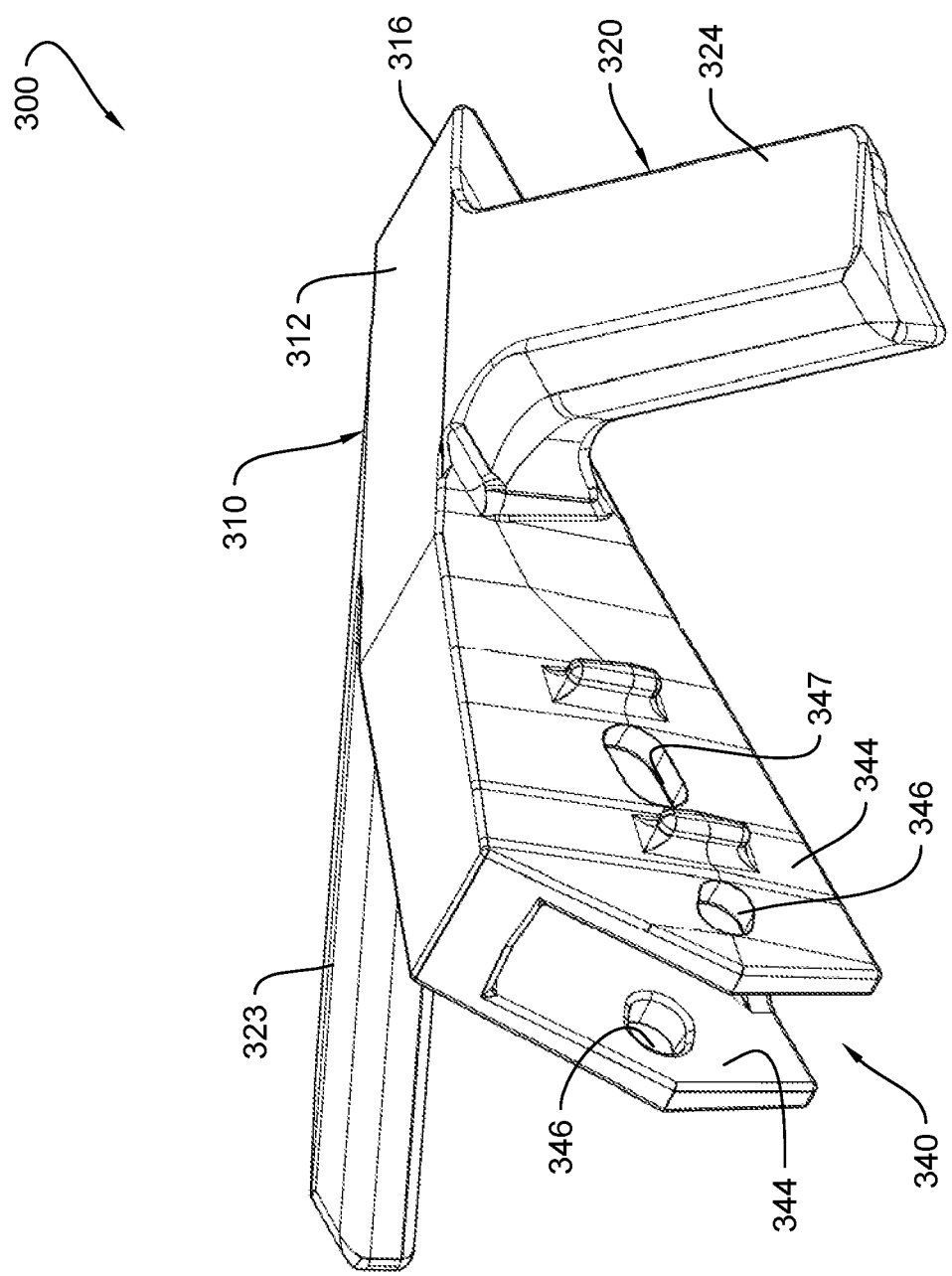
FIG. 28 is a top, rear perspective view of the ripper point of FIG. 27.
Figure 29:
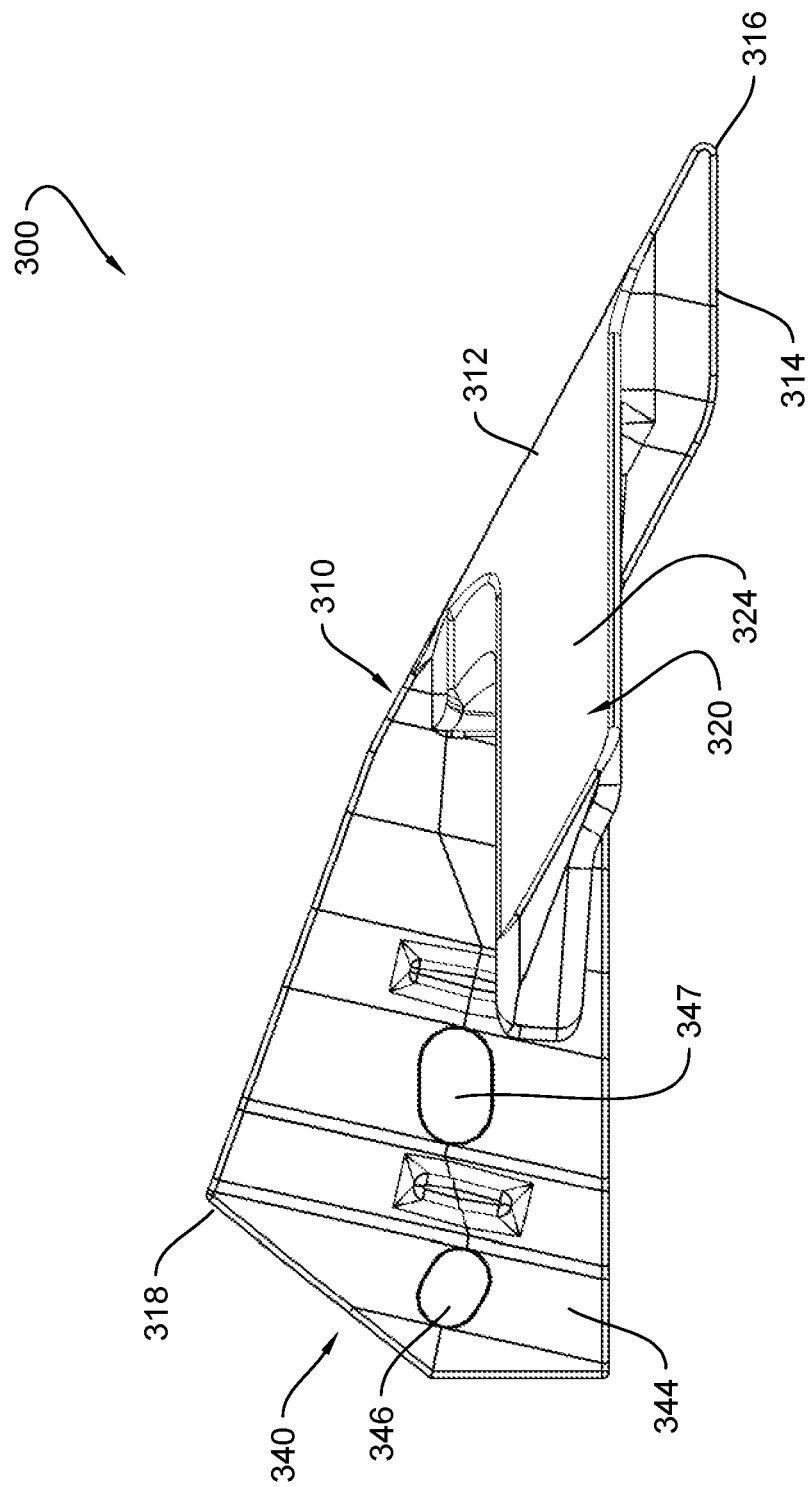
FIG. 29 is a right side elevation view of the ripper point of FIG. 27.
Figure 30:
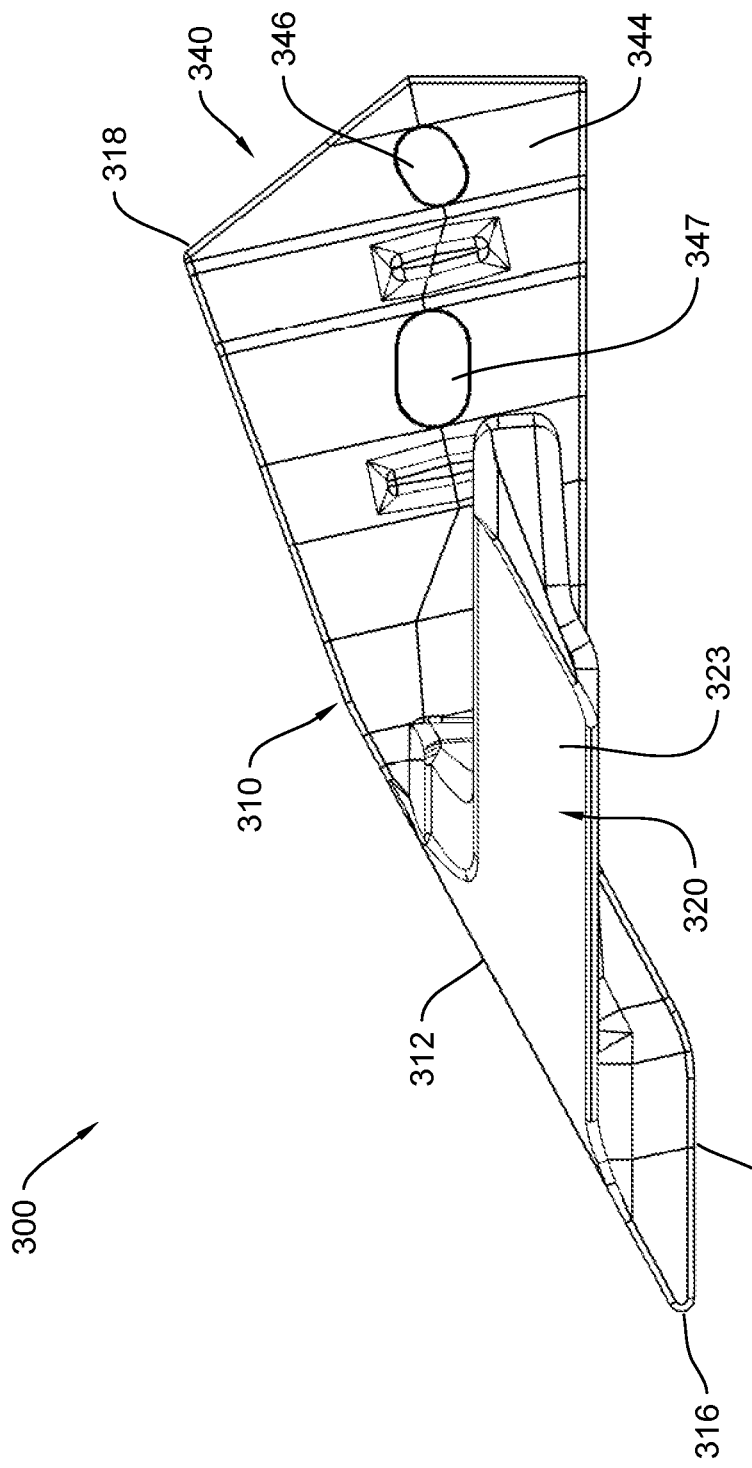
FIG. 30 is a left side elevation view of the ripper point of FIG. 27.

Continuing to refer to FIGS. 19 and 20, the wing member 220 includes a central portion 222 which engages with the recessed area 219 formed in the upper surface 212 of the main body 210 and is secured thereto by welds. The wing member 220 includes right and left wing sections 223, 224 which sweep rearwardly, defining a leading edge 225 and a trailing edge 226 and wing tips 227 as best viewed in FIG. 21. The wing sections 223, 224 also angle downwardly from the central portion 222.

Referring to FIGS. 19, 20, 22, and 24, the wing support plate 230 includes a triangular shaped head 232 with a cutout 234 sized to receive the underside of the main body 210. The triangular shaped head 232 is configured to engage with the underside of the wing sections 223, 224. Welds secure the triangular head 232 to the main body 210 and to the underside of the wing sections 223, 224, thereby providing structural support and rigidity to the wing sections 223, 224. A rearward end of the wing support plate 230 forms a U-shaped channel with a bottom wall 236 and upwardly extending sidewalls 244. The upwardly extending sidewalls 244 are welded to the underside of the tail end 218 of the main body 210 forming the shank bracket 240. Apertures 246, 247 are provided in the sidewalls 244 for bolting the ripper point 200 to the shank 20 of the tillage implement in substantially the similar manner as shown in FIG. 3A.

It should be appreciated that the main body 110, 210 of the ripper point embodiments 100, 200 may be fabricated from a plurality of stacked steel plates welded or bolted together, rather than the main bodies being fabricated from a single piece of steel as shown.

FIGS. 27-34 illustrate a third embodiment of a ripper point 300. The third ripper point embodiment 300 has substantially the same overall configuration as the first and second ripper point embodiments 100, 200 except that the third ripper point embodiment 300 is formed as a single cast piece as compared to a weldment comprised of multiple pieces welded together.

The third ripper point embodiment 300 is comprised of a main body 310, having wing member 320 and a shank bracket 340. The main body 310 is wedge shaped with an upper surface 312 and a lower surface 314 and includes a forward nose 316 and a rearward tail 318. The upper surface of the main body 310 slopes slightly toward the tail 218. The nose 316 is beveled on the lower surface 314 such that when the ripper point 300 is attached to a shank 20 of the tillage implement (see, e.g., FIGS. 3A-3B), the lower surface of the beveled nose 316 defines a substantially horizontal cutting plane CP.

Figure 31:
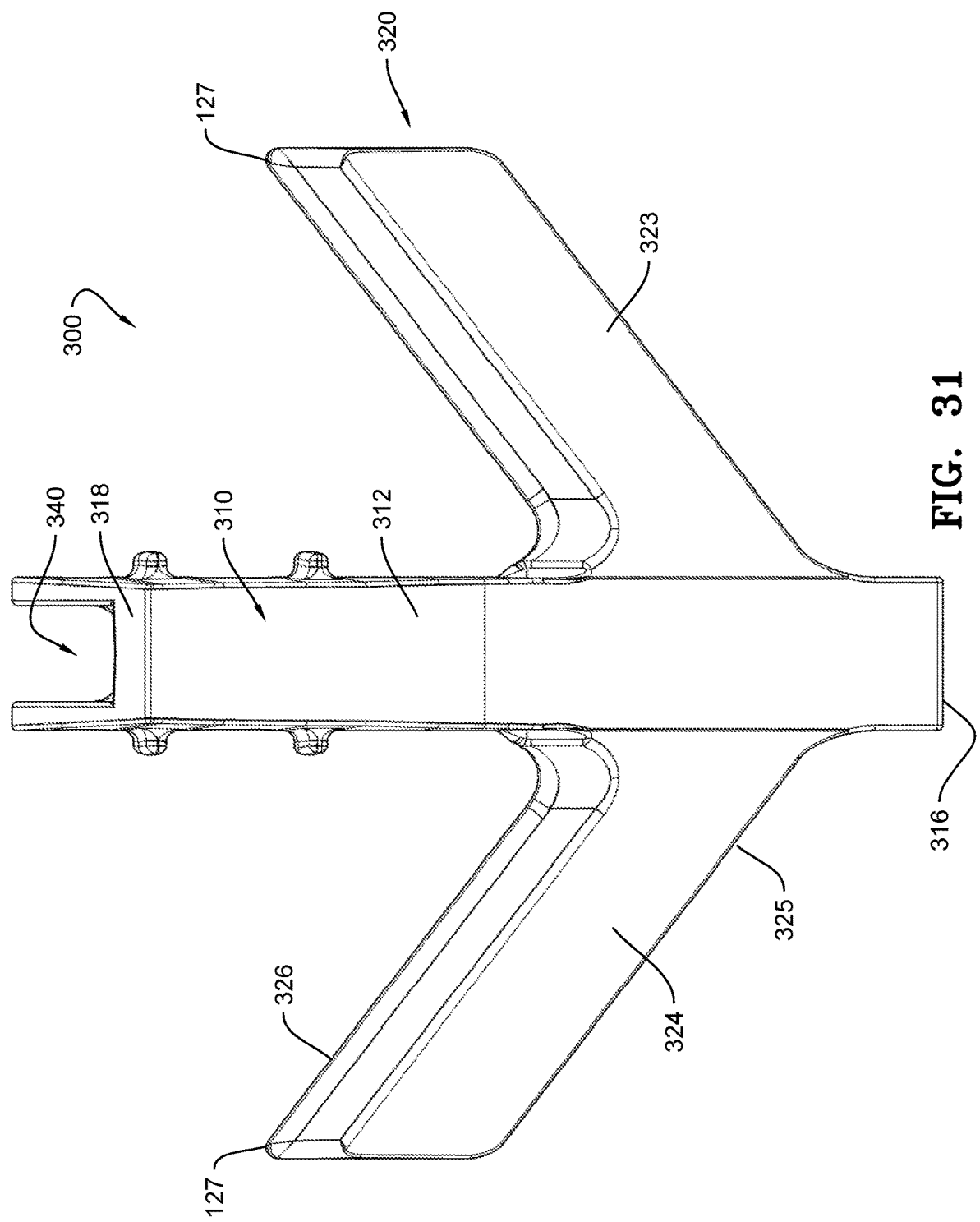
FIG. 31 is a top plan view of the ripper point of FIG. 27.
Figure 32:
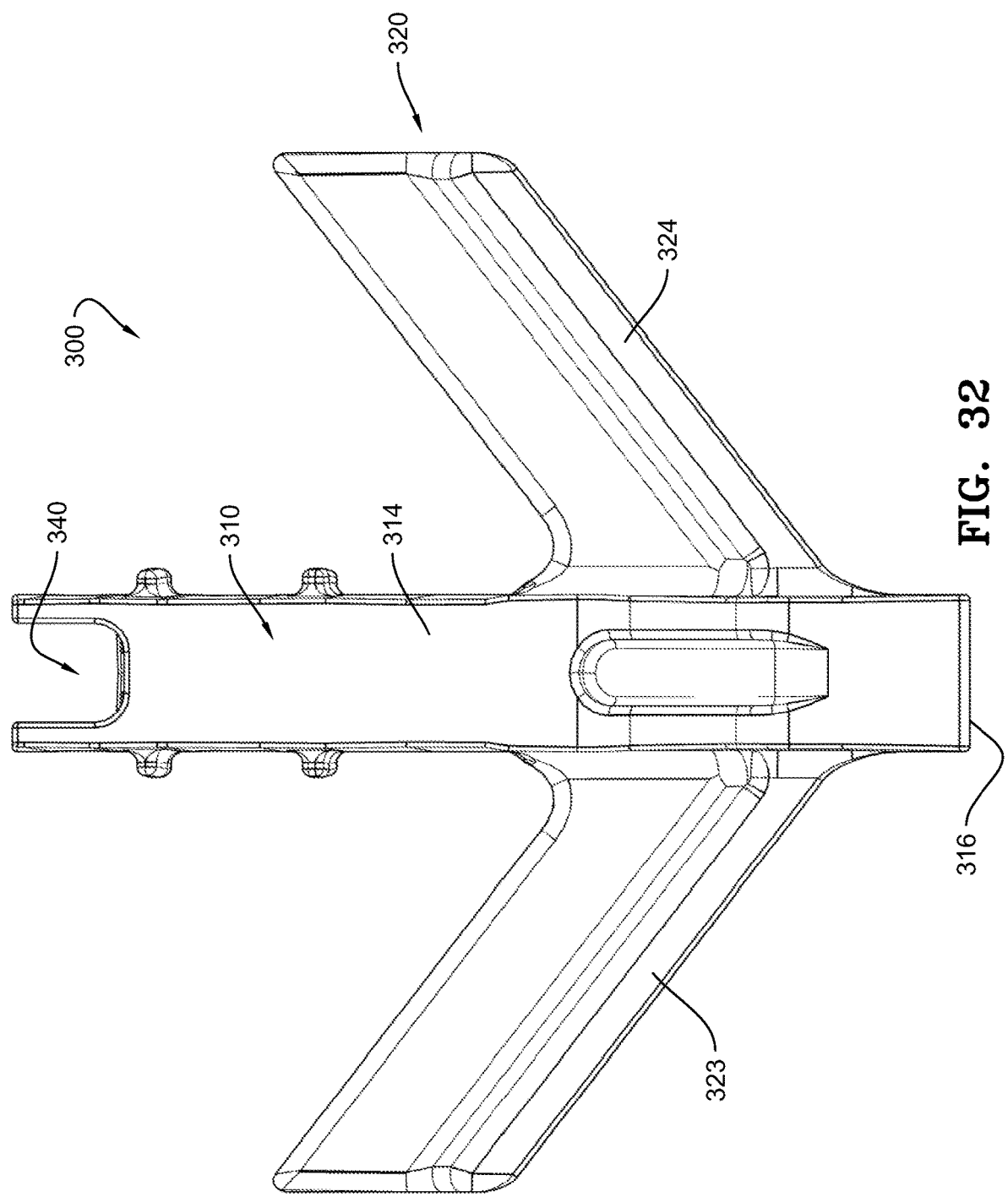
FIG. 32 is a bottom plan view of the ripper point of FIG. 27.
Figure 33:
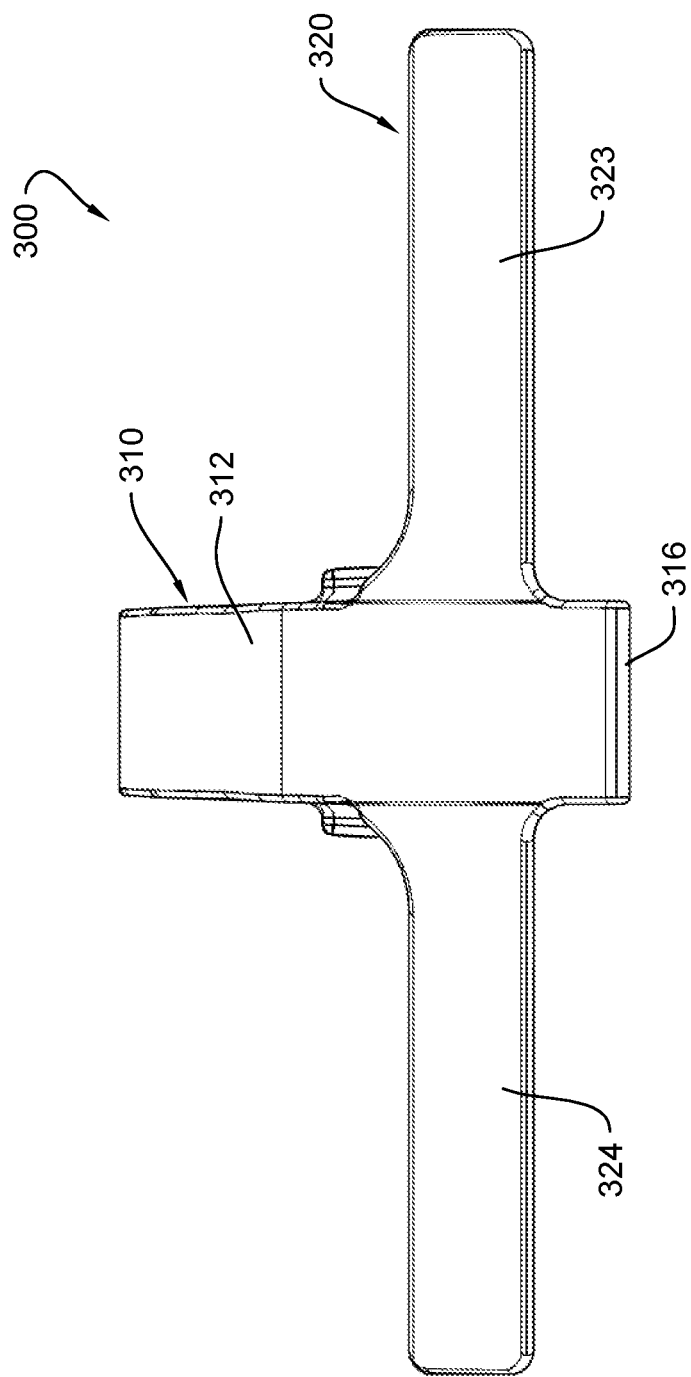
FIG. 33 is a front elevation view of the ripper point of FIG. 27.
Figure 34:
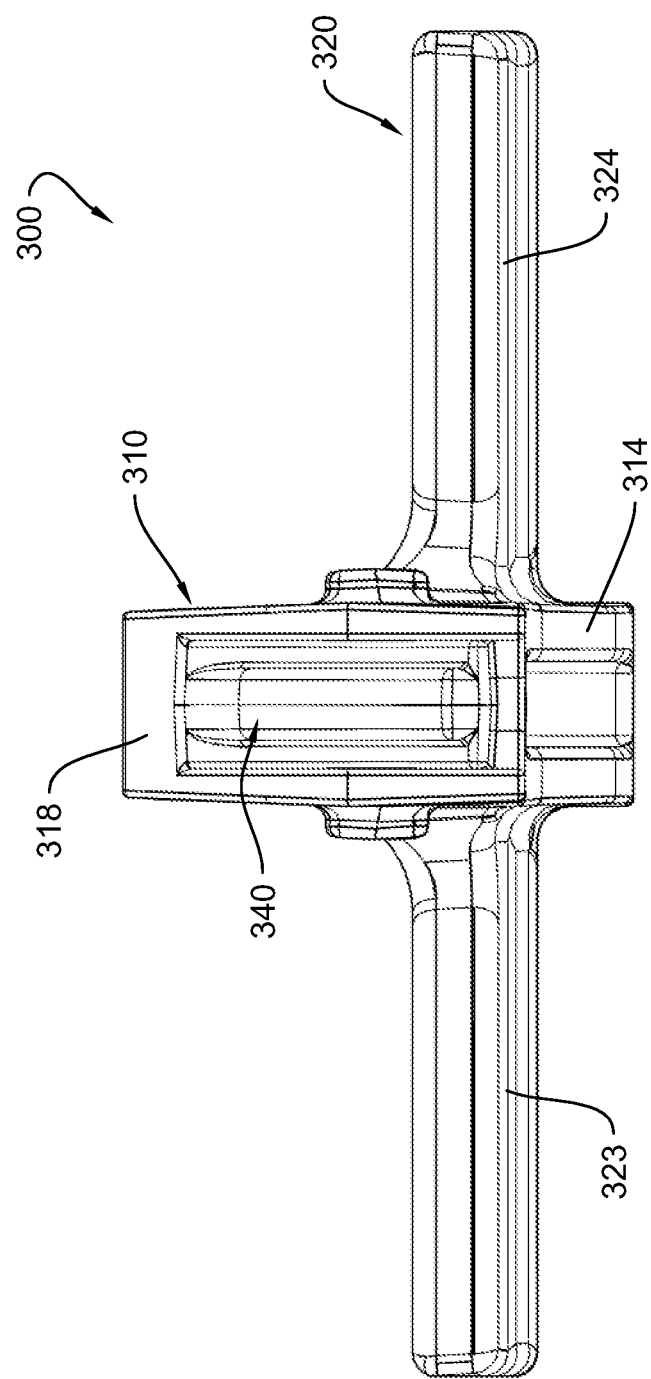
FIG. 34 is a rear elevation view of the ripper point of FIG. 27.
Figure 35:
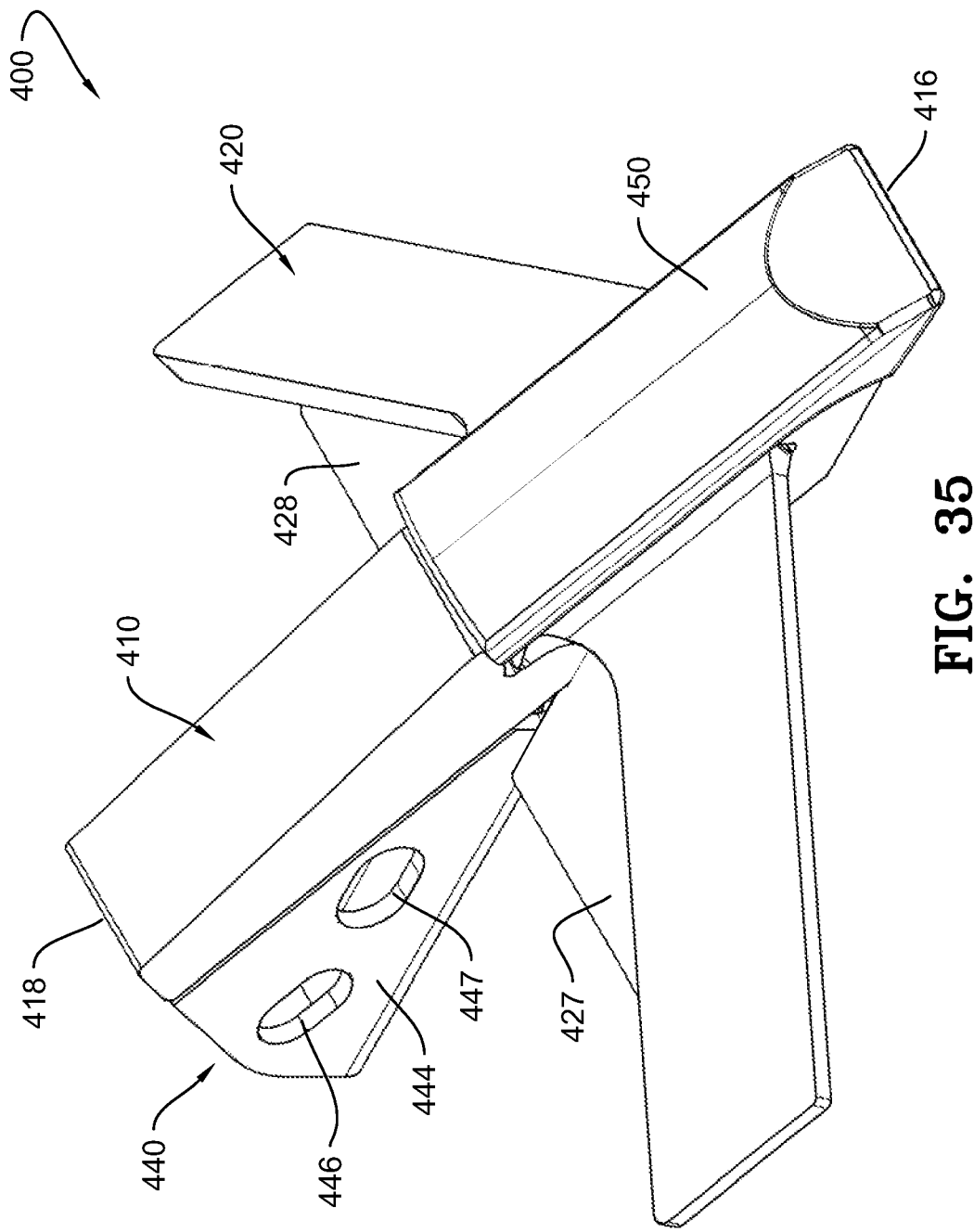
FIG. 35 is a top, front perspective view of another embodiment of the ripper point of the present invention.
Figure 36:
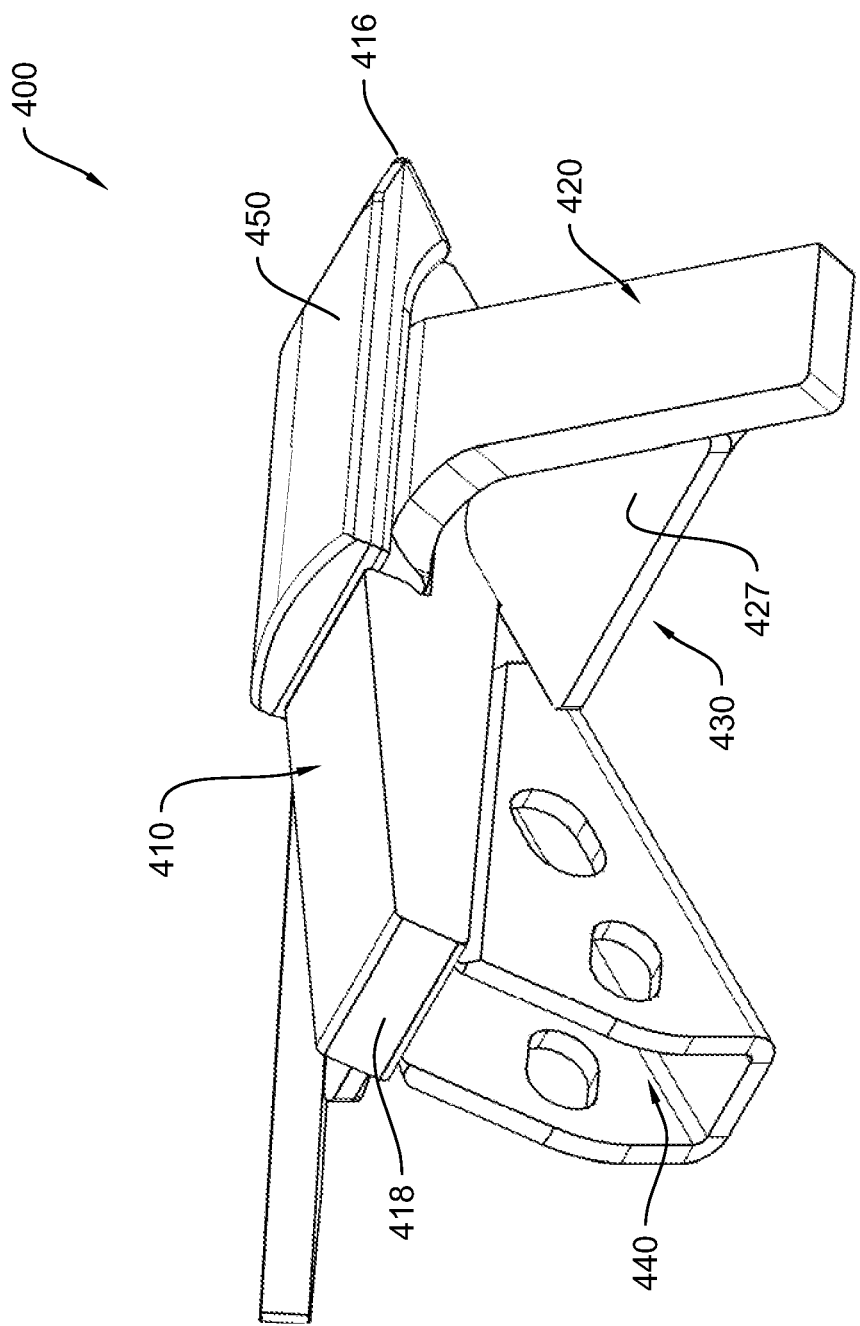
FIG. 36 is a top, rear perspective view of the ripper point of FIG. 35.
Figure 37:
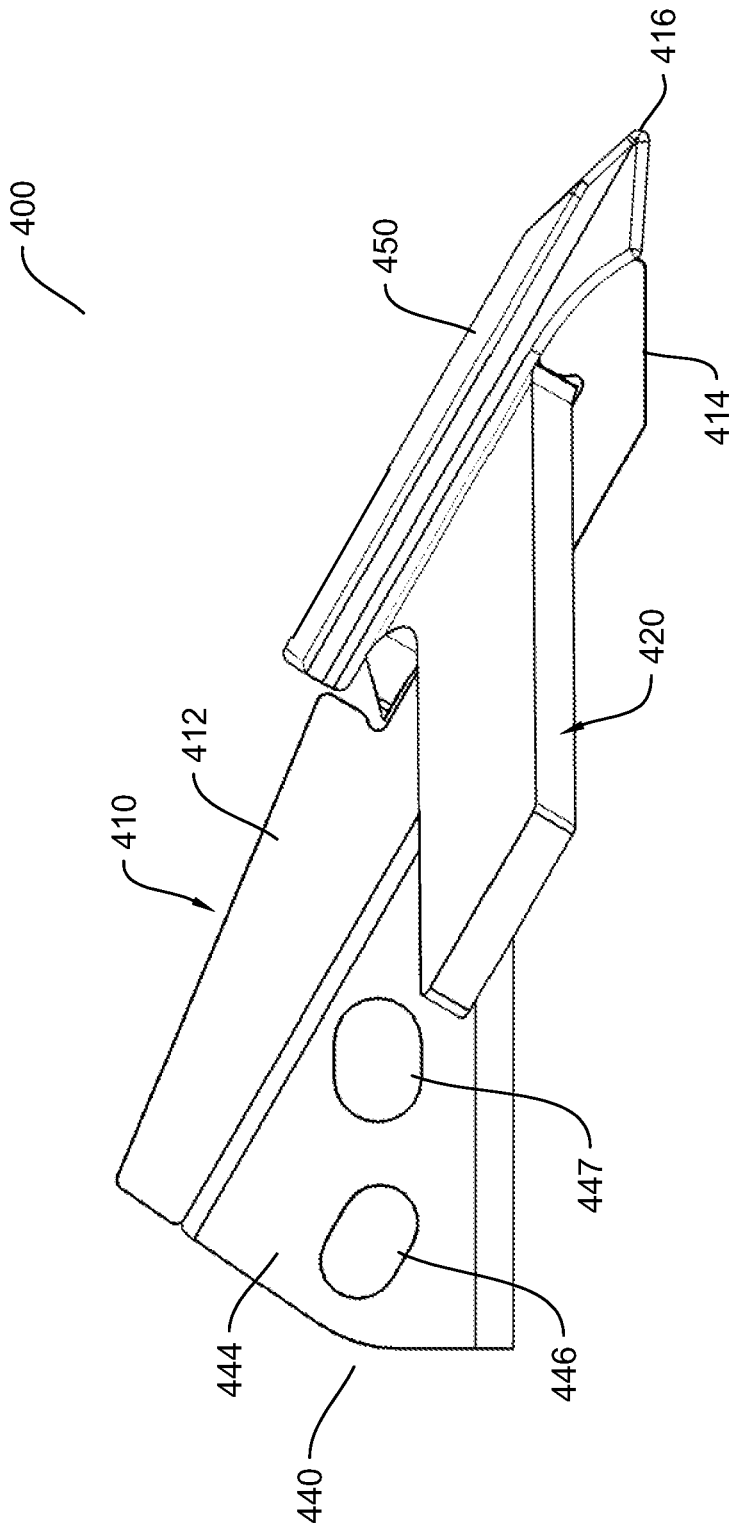
FIG. 37 is a right side elevation view of the ripper point of FIG. 35.
Figure 38:
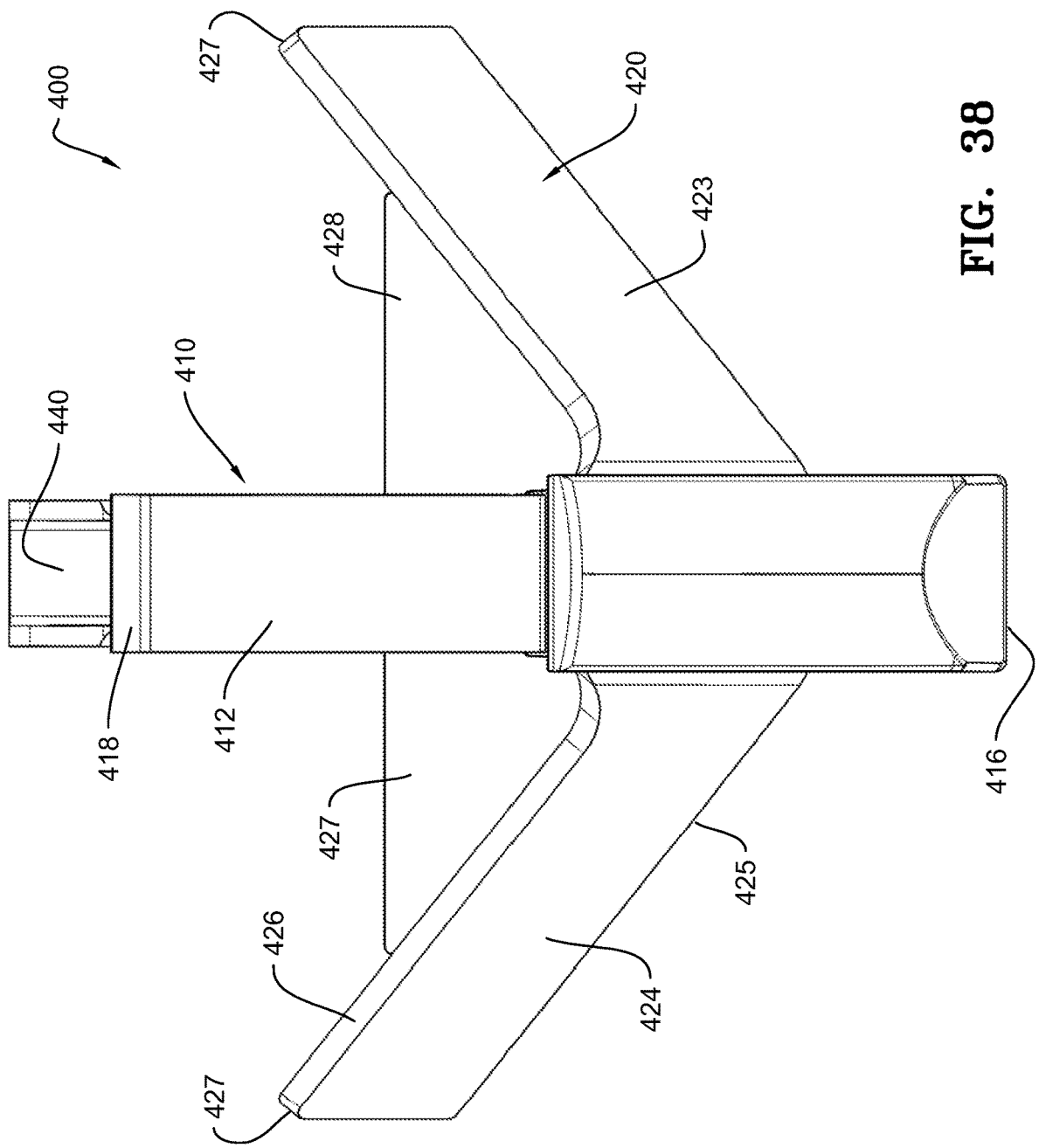
FIG. 38 is a top plan view of the ripper point of FIG. 35.
Figure 39:
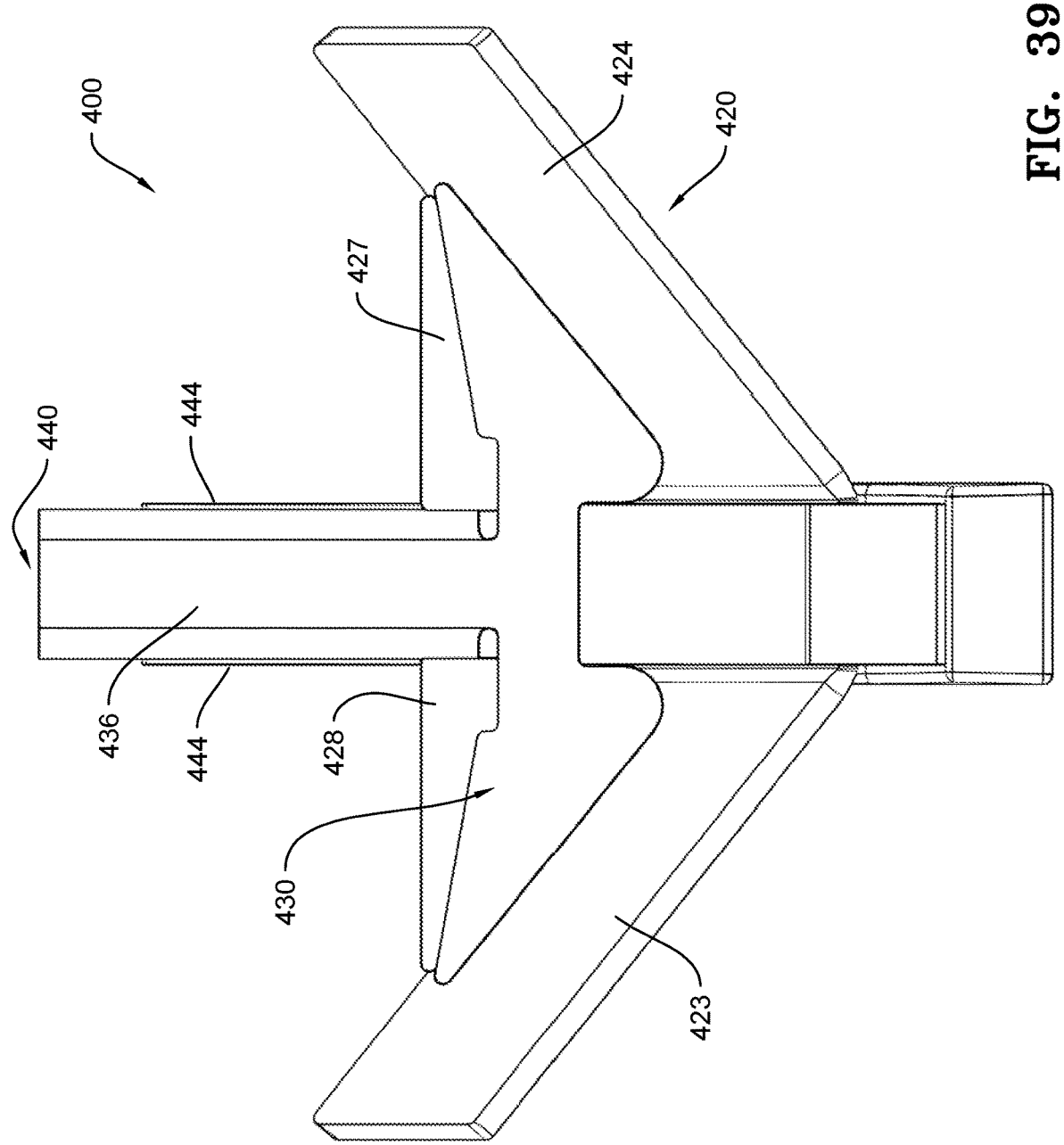
FIG. 39 is a bottom plan view of the ripper point of FIG. 35.
Figure 40:
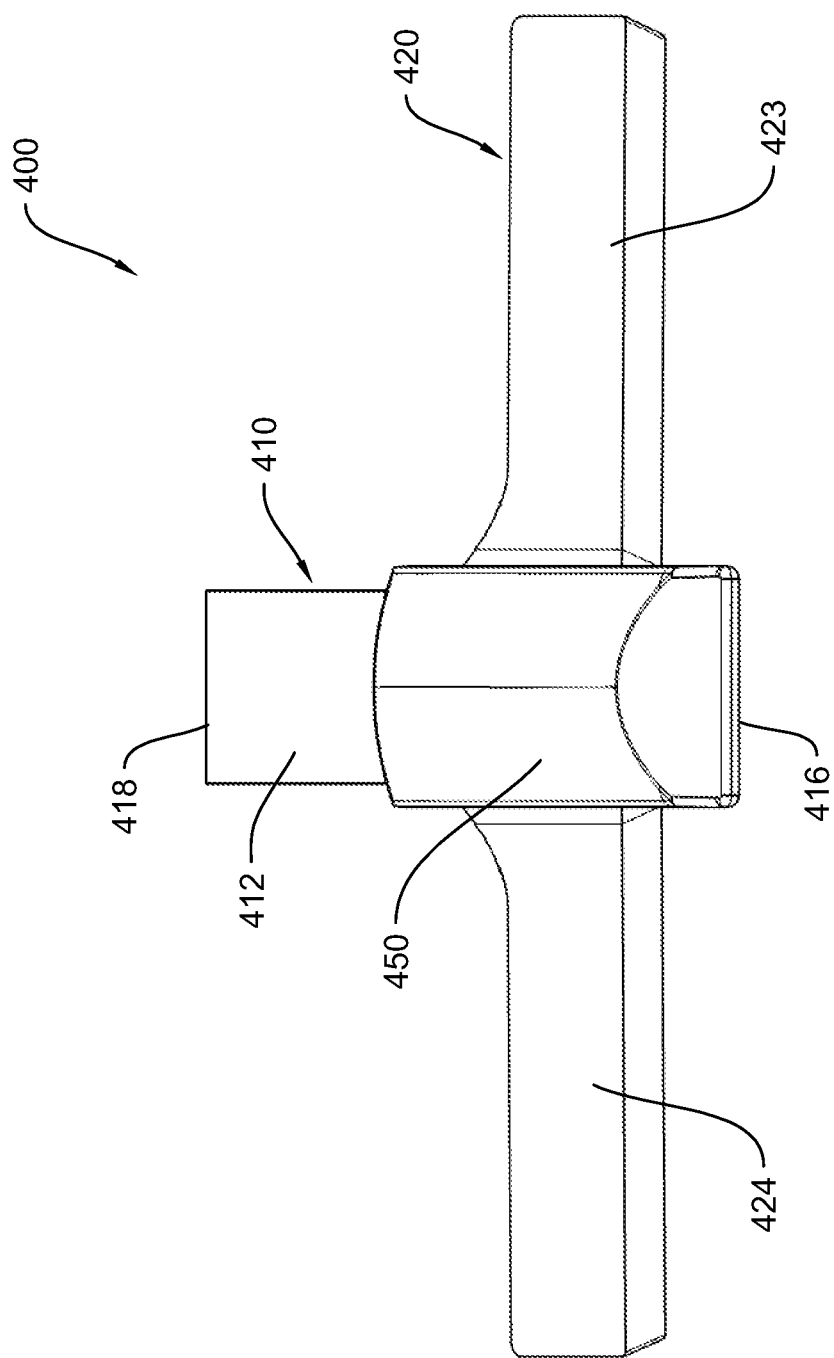
FIG. 40 is a front elevation view of the ripper point of FIG. 35.
Figure 41:
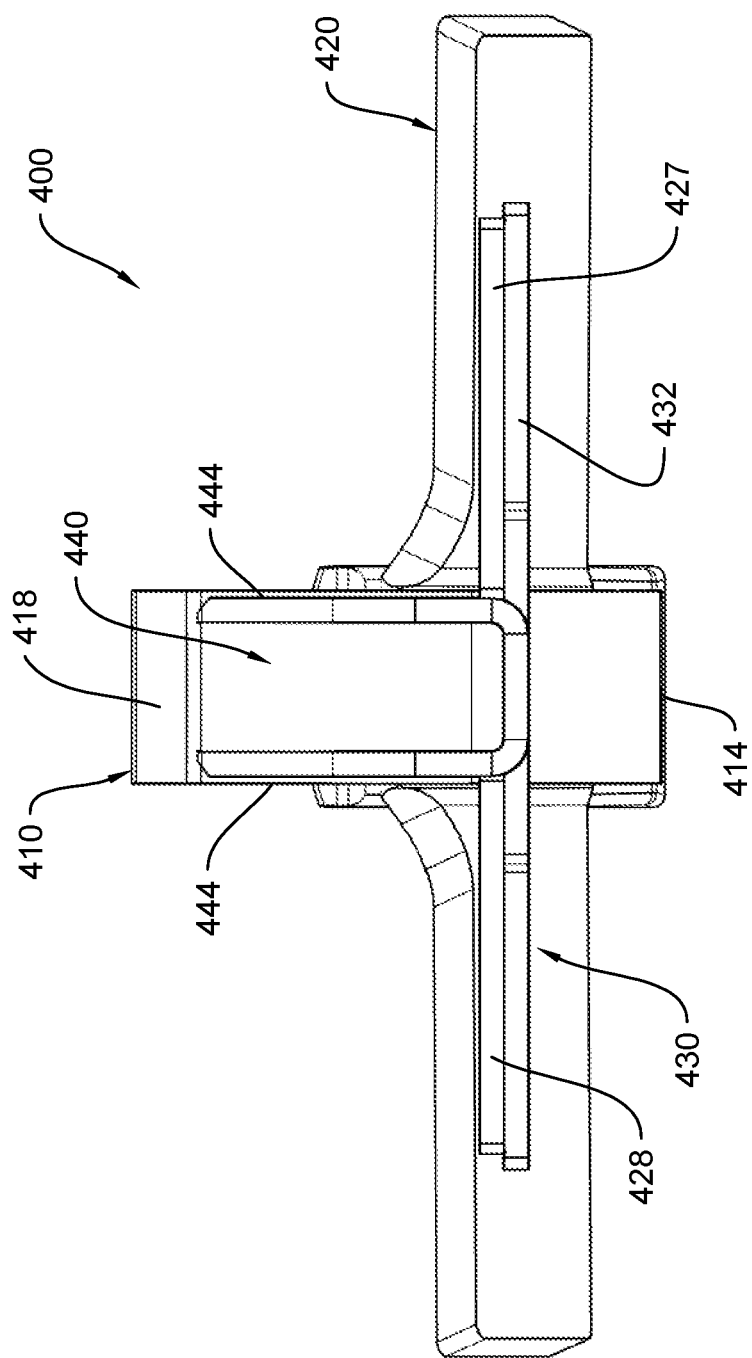
FIG. 41 is a rear elevation view of the ripper point of FIG. 35.

The wing member 320 includes right and left wing sections 323, 324 which sweep rearwardly, defining a leading edge 325 and a trailing edge 326 and wing tips 327 as best viewed in FIG. 31. The wing sections 323, 324 also angle downwardly from the main body 310. In this embodiment, the wing sections cast together with the main body 310 as a single unit.

The tail end 318 of the main body forms an inverted U-shaped channel with downwardly extending sidewalls 344 forming the shank bracket 340. Apertures 346, 347 are provided in the sidewalls 344 for bolting the ripper point 300 to the shank 20 of the tillage implement in substantially the similar manner as shown in FIG. 3A. Outwardly projection lugs 349 may be provided on the sidewalls 344 to serve as stops for mounting plates that may be disposed between the stops when mounting the ripper point 300 to the shank 20.

FIGS. 35-43 illustrate a fourth embodiment of a ripper point 400. The fourth ripper point embodiment 400 has substantially the same overall configuration as the first, second and third ripper point embodiments 100, 200, 300 except that the fourth ripper point embodiment 400 is comprised of pieces which are welded together as best illustrated in the exploded perspective views of FIGS. 42 and 43.

The fourth ripper point embodiment 400 is comprised of a main body 410, a wing member 420, and a wing support plate 430 that also forms the shank bracket 440. As best viewed in FIGS. 42 and 43, the main body 410 is generally rectangular in configuration with an upper surface 412 and a lower surface 414 and a rearward tail 418. The main body 410 tapers slightly, toward the tail 418. Referring again to FIGS. 42 and 43, the upper surface 412 of the main body 4210 includes recessed area 419 to receive the wing member 420. It should be appreciated that the main body 410 may be fabricated from a plurality of steel plates welded or bolted together, rather than being fabricated from a single piece of steel as shown.

The wing member 420 includes a central portion 422 which engages with the recessed area 419 formed in the upper surface 412 of the main body 410 and is secured thereto by welds. The wing member 420 includes right and left wing sections 423, 424 which sweep rearwardly, defining a leading edge 425 and a trailing edge 426 as best viewed in FIG. 38. The wing sections 423, 424 also angle downwardly from the central portion 422.

A nose cap 450 is welded over the wing member 420 received within the recess 419. The nose cap 450 and the main body 410 are beveled on the lower surface 414 such that when the ripper point 400 is attached to a shank 20 of the tillage implement (see e.g., FIGS. 3A-3B), the lower surface of the beveled nose 416 defines a substantially horizontal cutting plane CP.

Figure 42:
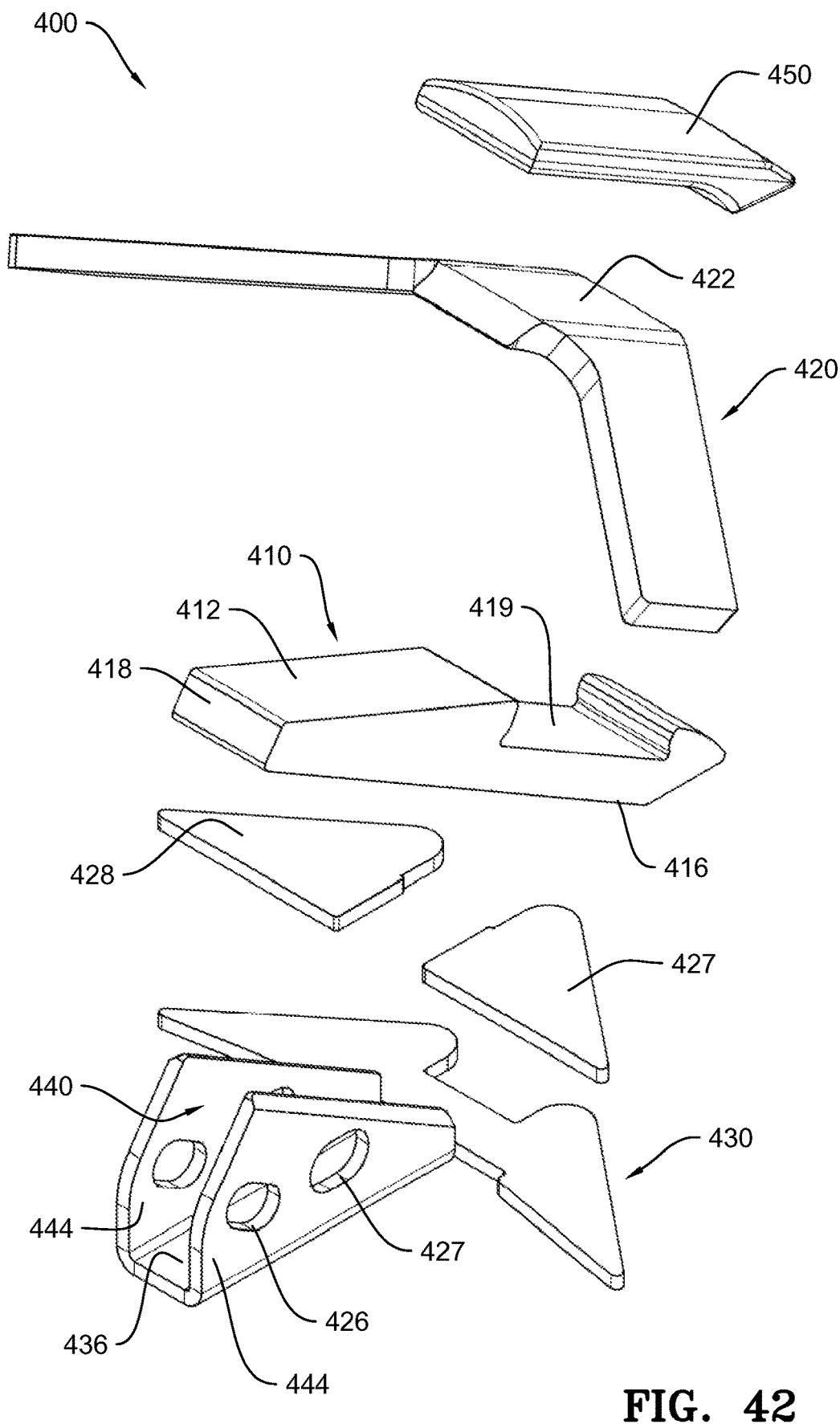
FIG. 42 is an exploded rear perspective view of the ripper point of FIG. 35.
Figure 43:
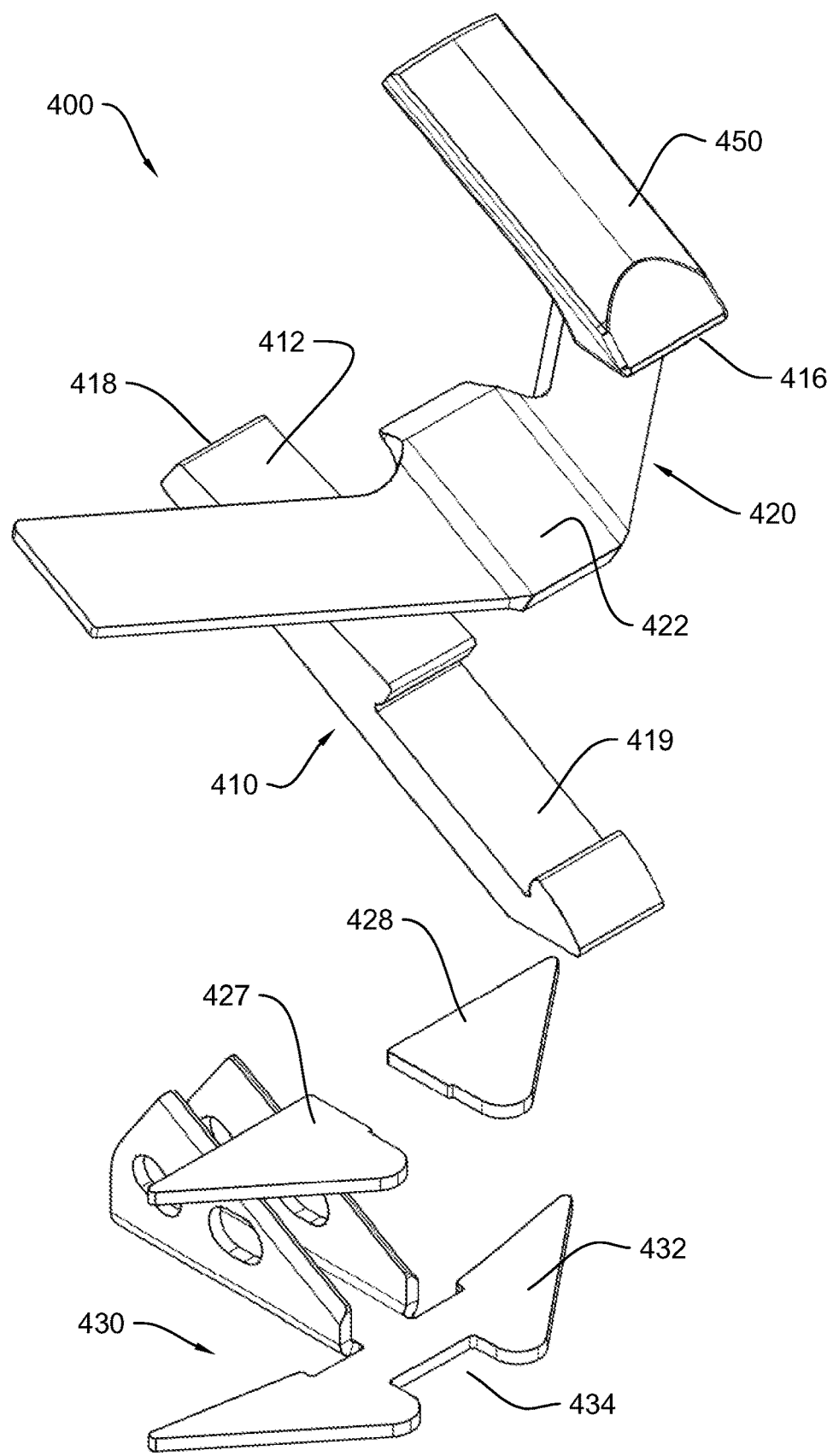
FIG. 43 is an exploded front perspective view of the ripper point of FIG. 35.

Continuing to refer to FIGS. 42 and 43, the wing support plate 430 includes a triangular shaped head 432 with a cutout 434 sized to receive the underside of the main body 410. The triangular shaped head 432 is configured to engage with the underside of the wing sections 423, 424. Welds secure the triangular head 432 to the main body 410 and to the underside of the wing sections 423, 424, thereby providing structural support and rigidity to the wing sections 423, 424. Additional gusset plates 427, 428 may be added to provide additional structural support and rigidity. A rearward end of the wing support plate 430 forms a U-shaped channel with a bottom wall 436 and upwardly extending sidewalls 444. The upwardly extending sidewalls 444 are welded to the underside of the tail end 418 of the main body 410 forming the shank bracket 440. Apertures 446, 447 are provided in the sidewalls 444 for bolting the ripper point 400 to the shank 20 of the tillage implement in substantially the similar manner as shown in FIG. 3A.

Figure 46:
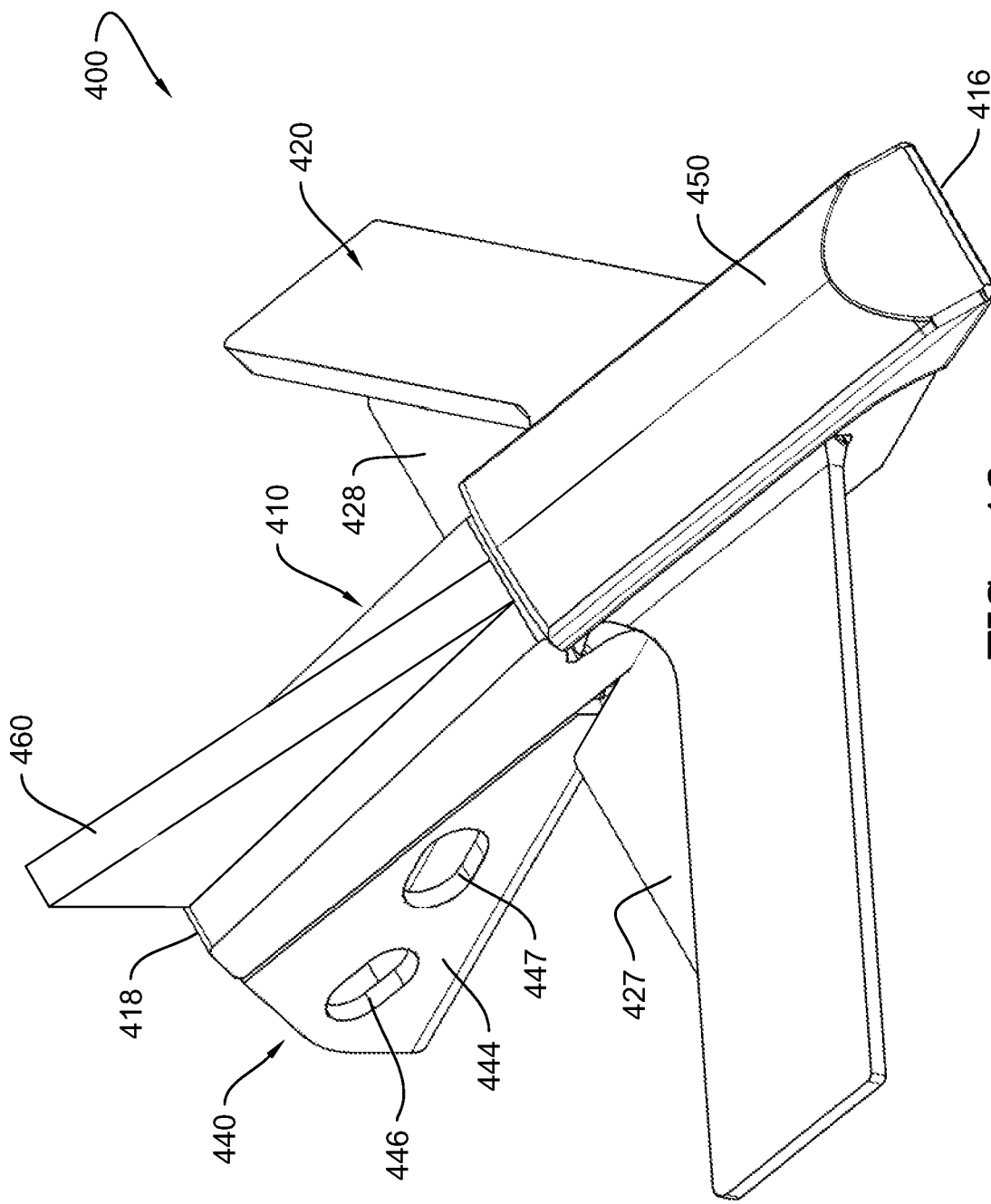
FIG. 46 is an alternative embodiment of the ripper point of FIG. 35 having a fin.

FIGS. 44 and 45, illustrate an embodiment of a surface treatment 500 which may be applied to any of the embodiments 100, 200, 300, 400 of the ripper point for abrasion resistance, to increase hardness and wear resistance. The surface treatment may be any suitable hard-facing or hard-surfacing welding alloy. The surface treatment may be applied in one layer or multiple layers. In the example shown in FIGS. 44 and 45, the surface treatment 500 is applied to the top surface of the wings 120, 220, 320, 420 as indicated by the arcuate lines to represent weld beads. In this embodiment, the surface treatment 500 is applied to provide two parallel cavities (i.e., non-hard surfaced areas) on the top surface of the wings. It has been found that such parallel cavities (having a depth of approximately ⅛ inch from the top of the hard-surfacing) capture soil to provide a soil-on-soil wear mechanism which reduces drag (and therefor reducing horsepower requirements) while still maintaining a uniform subsurface soil profile. The dimensions identified on FIG. 45, are provided as examples only and are not intended to be limiting. The surface treatment 500 may also be applied to the leading edges 125, 225, 325, 425, the trailing edges 126, 226, 326, 426 of the wings 120, 220, 320, 420. Surface treatment may also be applied to other areas of ripper point such as near the rearward end 118, 218, 318, 418 or to the bottom side of the wings or at the base of the wings where they meet the main body 110, 210, 310, 410. The placement of surface treatment on the rearward end 118, 218, 318, 418 of the main body 110, 210, 310, 410, not only reduced wear but also turbulates the flow of soil ahead of the shank 20. Testing has shown that the rearward end 118, 218, 318, 418 and the shank 20 are high wear areas. If surface treatment is applied to greater thickness (e.g., greater than the ⅛ inch thickness on the wing surface as identified above), the soil flow is disrupted, thereby prolonging the life of the shank 20. In an alternative embodiment as shown in FIG. 46, a fin 460 may be attached to the main body 110, 210, 310, 410 to also disrupt the soil flow ahead of the shank, thereby prolonging the life of the shank 20.

It should be appreciated that although construction varies between the three embodiments 100, 200, 300, 400 each of the three embodiments have substantially the same overall configuration and geometry as described in connection with embodiment 100. Thus, when the ripper points 100, 200, 300, 400 are mounted to the shanks 20 of the tillage implement, due to the wider wingspan in comparison to conventional ripper points, the horizontal distance B (FIG. 2) between the wing tips 127, 227, 327, 427 of the adjacent wings is significantly less than the distance A (FIG. 1) of conventional ripper points. Additionally, in each of the embodiments 100, 200, 300, 400 the vertical distance Y (FIG. 2) between the leading edges 116, 216, 316, 416 of the main bodies 110, 210, 310, 410 of the ripper points 100, 200, 300, 400 and the respective leading edges 125, 225, 325, 425 of the wings 120, 220, 320, 420 is preferably around 1 inch which is significantly shallower than the vertical distance X (FIG. 1) of the corresponding parts of conventional ripper points.

Additionally, in order to reduce drag on the ripper points as they are pulled through the soil, in each of the embodiments 100, 200, 300, 400 the leading edge 125, 225, 325, 425 of the wings is sloped downwardly and forwardly from the trailing edges 126, 226, 326, 426 of the respective wing members 120, 220, 320, 420. Such configuration has been shown to produce a soil profile with little or no undesirable mounds of compact soil being formed between the wingtips 127, 227, 327, 427.

The ripper points 100, 200, 300, 400 are configured to reduce drag on the leading edges of the wings while still having an optimal working width between wing tips 127. Wings 120, 220, 320, 420 engage the soil at a shallower depth than the leading edge of the nose 116, 216, 316, 416 while being forwardly positioned along main body 110, 210, 310, 410 such that the leading and trailing wings edges 125/126, 225/226, 325/326, 425/426 minimize peaks and valleys in the soil profile. In such a configuration, the leading edges 125, 225, 325, 425 engage and fracture harder compacted soil (i.e., hardpan), while the wings 120, 220, 320, 420 lift and twist looser soil, thereby burying residue and adding oxygen to the soil. The wing sections 123/124, 223/224, 323/324, 423/424 are angled downwardly with respect to the main body 110, 210, 310, 410 about an axis perpendicular to the direction of travel. This configuration enables each wing 120, 220, 320, 420 to produce a greater degree of soil fracture, thereby increasing soil oxygen content and enhancing root growth. Additionally, the leading edges 125, 225, 325, 425 of each wing is configured to engage the soil at a greater depth than the trailing edges 126, 226, 326, 426 of the wing which is believed to substantially reduce or eliminate soil compaction under the wings 120, 220, 320, 426.

It should be appreciated that the wingtip-to-wingtip spacing referred to herein, is meant to include both longitudinally and laterally aligned ripper points as well as staggered configurations in which one ripper point mounted longitudinally rearward of a preceding adjacent ripper points.

The configurations of the ripper points 100, 200, 300, 400 are capable of operating over the range of depths at which deep tillage implements are typical used and over a range of speeds of the tillage implement 10 producing a uniform and ideal subsurface soil profile.

Various embodiments of the invention have been described above for purposes of illustrating the details thereof and to enable one of ordinary skill in the art to make and use the invention. The details and features of the disclosed embodiments are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A tillage point configured to connected to an implement shank to produce a uniform subsurface soil profile when drawn through the field, the tillage point comprising:

a main body having a top side and a bottom side, a forward nose portion, a rearward tail portion and a central portion between the forward nose portion and the rearward tail portion;

a left wing section extending laterally outward from a left side of the main body; and a right wing section extending outward from a right side of the main body, the left wing section terminating in a left wingtip, the right wing section terminating in right wingtip, each of the left and right wing sections having a top side and a bottom side, a leading edge and a trailing edge; and a shank cavity disposed at the rearward tail portion of the main body, a forward end of the implement shank receivably and rigidly secured within the shank cavity;

whereby, with the implement shank receivable and rigidly secured within the shank cavity:

the forward nose portion includes a leading edge and a generally horizontally planar bottom surface extending a distance generally horizontally rearward from the leading edge toward the rearward tail portion, the generally horizontally planar bottom surface defining a cutting plane at a lowermost end of the tillage point, the top surface at the forward nose portion sloping upwardly at an angle with respect to the cutting plane toward the central portion thereby defining a nose bevel angle;

whereby, when viewed in a front elevation view, the leading edges of each of the left and right wing sections extend laterally and generally horizontally from the main body defining a wing plane, the wing plane being offset vertically above and parallel with the generally horizontally planar bottom surface of the forward nose portion; and when viewed in a top plan view, the leading edge of each of the left and right wing sections diverge outwardly from the central portion of the main body to the respective left and right wingtips and rearwardly toward the rearward tail portion defining a rearward sweep angle.

2. The tillage point of claim 1 wherein the top surface of each of the left and right wing sections slope downwardly from the trailing edge to the leading edge of the respective left and right wing sections defining a wing slope angle.

3. The tillage point of claim 2, wherein the wing slope angle is between about 25 degrees to about 31 degrees.

4. The tillage point of claim 1, wherein the nose bevel angle is between about 25 degrees to about 31 degrees.

5. The tillage point of claim 1, wherein the rearward sweep angle of the respective left and right wing sections is between about 29 degrees to about 35 degrees.

6. The tillage point of claim 1, wherein the trailing edge of each of the left and right wing sections is thicker than the leading edge of each of the respective left and right wing sections.

7. The tillage point of claim 1, wherein the wing plane is vertically offset a distance above the cutting plane by a vertical offset distance, the vertical offset distance being no more than 4 inches.

8. The tillage point of claim 1, wherein a distance from the leading edge of each of the respective left and right wing sections nearest the top side of the main body to the leading edge of the forward nose portion is no more than 8 inches.

9. The tillage point of claim 1, wherein the distance from the right wingtip to the left wingtip is approximately 14 inches.

10. The tillage point of claim 1, wherein the nose bevel angle is approximately 28 degrees.

11. The tillage point of claim 1, wherein the rearward portion of the main body slopes upwardly at an angle relative to the cutting plane defining a rearward tail angle, the rearward tail angle being at an angle less than the nose bevel angle.

12. The tillage point of claim 11, wherein the rearward tail angle is approximately 21 degrees.

13. The tillage point of claim 1, wherein the shank cavity is defined by a shank bracket having side plates extending downwardly below the bottom side of the main body at the rearward tail portion and the bottom side at the rearward tail portion.

14. A tillage implement, comprising:
a first shank;
a second shank spaced a lateral distance from the first shank with respect to a forward direction of travel of the tillage implement, the lateral distance between the first and second shanks defining a lateral shank spacing;
a first ripper point secured to the first shank;
a second ripper point secured to the second shank;
wherein each of the first and second ripper points include:
a main body having a top side and a bottom side, a forward nose portion, a rearward tail portion, a central portion between the forward nose portion and the rearward tail portion;
a left wing section extending laterally outward from a left side of the central portion of the main body and a right wing section extending laterally outward from a right side of the central portion of the main body, the left wing section terminating in a left wingtip, the right wing section terminating in right wingtip, each of the left and right wing sections having a top side and a bottom side, a leading edge and a trailing edge; and
a shank cavity disposed at the rearward tail portion of the main body, a forward end of each of the respective first and second implement shanks receivably secured within the shank cavity of the respective first and second ripper points;
whereby, with the first and second implement shanks receivable and rigidly secured within the shank cavity of the respective first and second ripper points:
the forward nose portion of each of the first and second ripper points include a leading edge and a generally horizontal bottom surface extending a distance generally horizontally rearward from the leading edge toward the rearward tail portion, the generally horizontal bottom surface defining a cutting plane at a lowermost end of the tillage point, the top surface at the forward nose portion sloping upwardly at an angle with respect to the cutting plane toward the central portion thereby defining a nose bevel angle; and
whereby, when viewed in a front elevation view, the leading edges of each of the left and right wing sections extend laterally and generally horizontally from the main body defining a wing plane, the wing plane being offset vertically above and parallel with the generally horizontal bottom surface of the forward nose portion; and
whereby, when viewed in a top plan view, the leading edge of each of the left and right wing sections diverge outwardly from the central portion of the main body to the respective left and right wingtips and rearwardly toward the rearward tail portion defining a rearward sweep angle, and a lateral distance between the right wingtip of the first ripper point and left wingtip of the second ripper point is between 30% and 50% of the lateral shank spacing.

* * * * *

UNITED STATES PATENT AND TRADEMARK OFFICE
CERTIFICATE OF CORRECTION

PATENT NO. : 10,806,063 B2  
APPLICATION NO. : 15/404178  
DATED : October 20, 2020  
INVENTOR(S) : Anthony B. Carbaugh and Ryan Van Dusen Page 1 of 1

It is certified that error appears in the above-identified patent and that said Letters Patent is hereby corrected as shown below:

In the Claims

Claim 1, Column 7, Line 65, after "point" and before "connected" delete "configured to".

Claim 1, Column 8, Line 7, after "extending" and before "outward" insert -- laterally --.

Signed and Sealed this  
Fifteenth Day of December, 2020

Andrei Iancu  
*Director of the United States Patent and Trademark Office*